United States Patent
Stauffer et al.

(10) Patent No.: US 10,764,813 B2
(45) Date of Patent: Sep. 1, 2020

(54) MANAGING MOBILITY BETWEEN A CELLULAR NETWORK AND A WIRELESS LOCAL AREA NETWORK (WLAN)

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/054,848

(22) Filed: Aug. 3, 2018

(65) Prior Publication Data
US 2020/0045612 A1    Feb. 6, 2020

(51) Int. Cl.
*H04W 40/36* (2009.01)
*H04W 36/00* (2009.01)
*H04W 24/10* (2009.01)
*H04W 8/08* (2009.01)

(52) U.S. Cl.
CPC .......... *H04W 40/36* (2013.01); *H04W 8/087* (2013.01); *H04W 24/10* (2013.01); *H04W 36/0016* (2013.01); *H04W 36/0022* (2013.01); *H04W 36/0044* (2013.01); *H04W 36/0088* (2013.01)

(58) Field of Classification Search
CPC ..... H04W 40/36; H04W 8/087; H04W 24/02; H04W 24/06; H04W 24/10; H04W 36/0016; H04W 36/0022; H04W 36/0044; H04W 36/0088
USPC ................................................ 370/331–332
See application file for complete search history.

(56) References Cited

U.S. PATENT DOCUMENTS

| | | | | |
|---|---|---|---|---|
| 2016/0366720 | A1* | 12/2016 | Wu | H04W 28/0236 |
| 2017/0171782 | A1* | 6/2017 | Mohamed | H04W 36/0011 |
| 2018/0167859 | A1* | 6/2018 | Wu | H04W 76/19 |
| 2018/0255496 | A1* | 9/2018 | Kim | H04W 36/30 |
| 2018/0270682 | A1* | 9/2018 | Zacharias | H04W 24/10 |
| 2018/0279193 | A1* | 9/2018 | Park | H04W 36/08 |
| 2019/0159090 | A1* | 5/2019 | Keller | H04W 36/12 |
| 2019/0182841 | A1* | 6/2019 | Soldati | H04W 24/10 |

(Continued)

FOREIGN PATENT DOCUMENTS

| | | |
|---|---|---|
| CN | 101841880 | 9/2010 |
| WO | 2018017477 | 1/2018 |
| WO | 2018128494 | 7/2018 |

OTHER PUBLICATIONS

"3GPP TR 23.793 V0.5.0", 3GPP TR 23.793 V0.5.0 (Jun. 2018), Jun. 2018, 68 pages.

(Continued)

*Primary Examiner* — Candal Elpenord
(74) *Attorney, Agent, or Firm* — Colby Nipper PLLC (57) ABSTRACT

This document describes improvements in mobility management for user equipment (110) between a cellular network (202) and a WLAN network (206). A Cellular-WLAN Mobility Function (210) is introduced to manage routing of packet data over the cellular network (202) and the WLAN network (206) to the user equipment (110). The CWMF (210) enables the transfer of packet data context between the cellular network (202) and the WLAN network (206), improved handovers between the cellular network (202) and the WLAN network (206), Quality of Service (QoS) management of the WLAN network (206), and aggregation of cellular and WLAN bandwidths to improve data throughput for user equipment 110.

21 Claims, 8 Drawing Sheets

(56) References Cited

U.S. PATENT DOCUMENTS

2019/0191330 A1* 6/2019 Dao .................... H04L 12/4633
2019/0306068 A1* 10/2019 Kiss ..................... H04W 60/00

OTHER PUBLICATIONS

"International Search Report and Written Opinion", PCT Application No. PCT/US2019/043697, dated Sep. 10, 2019, 18 pages.

* cited by examiner

MANAGING MOBILITY BETWEEN A CELLULAR NETWORK AND A WIRELESS LOCAL AREA NETWORK (WLAN)

BACKGROUND

The evolution of wireless communication to fifth generation (5G) standards and technologies provides higher data rates and greater capacity with improved reliability and lower latency that enhances mobile broadband services. 5G technologies also provide new classes of service for vehicular networking, fixed wireless broadband, and the Internet of Things (IoT).

For a class of service, such as enhanced mobile broadband, 5G networks provide higher data rates than conventional cellular systems. However, it is still desirable to use Wireless Local Area Network (WLAN) networks for mobile broadband in various settings, such as a home or office, or to reduce power consumption in mobile devices.

Offloading data traffic from cellular networks to WLAN and handing over network connections from cellular to WLAN reduces the cost of data transmission for end users and network operators. However, conventional techniques for interoperability between cellular and WLAN place the burden of tracking Internet Protocol (IP) sessions and addresses during handovers on application layer entities and these techniques have challenges with handover timing, dropped data traffic and context, unreliable WLAN access points, varying levels of service quality, or the like.

SUMMARY

This summary is provided to introduce simplified concepts of managing mobility between a cellular network and a wireless local area network (WLAN). The simplified concepts are further described below in the Detailed Description. This summary is not intended to identify essential features of the claimed subject matter nor is it intended for use in determining the scope of the claimed subject matter.

In some aspects, a method of managing mobility of a user equipment between a wireless local area network (WLAN) and a cellular network is described, in which a Cellular-WLAN Mobility Function (CWMF) server sends a measurement report request to a user equipment, via an Access and Mobility Function (AMF) and a base station, and receives one or more measurement reports from the user equipment via the base station and the AMF. The CWMF server determines, based at least in part on the one or more measurement reports, to initiate handover of the user equipment between the cellular network and the WLAN network and sends a first handover message to the user equipment, via the AMF and the base station, and sends a second handover message to the base station via the AMF in the cellular network, is the first handover message and the second handover message being effective to cause the handover of the user equipment between the cellular network and a first WLAN access point in the WLAN network.

In other aspects, a Cellular-WLAN Mobility Function (CWMF) server device includes one or more processors and a memory comprising instructions for a Cellular-WLAN Mobility Manager application. The instructions are executable by the one or more processors to configure the one or more processors to send a measurement report request to a user equipment via an Access and Mobility Function (AMF) and a base station, and receive one or more measurement reports from the user equipment via the base station and the AMF. The instructions are executable by the one or more processors to configure the one or more processors to determine, based at least in part on the one or more measurement reports, to initiate handover of the user equipment between a cellular network and a WLAN network, and send a first handover message to the user equipment, via the AMF and the base station, and send a second handover message to the base station via the AMF in the cellular network, the sending the first handover message and the second handover message effective to cause the handover of the user equipment between the cellular network and a first WLAN access point in the WLAN network.

In further aspects, a method of managing mobility of a user equipment between a WLAN network and a cellular network is described in which the user equipment sends one or more measurement reports to a Cellular-WLAN Mobility Function (CWMF), via a base station and an Access and Mobility Function (AMF). The user equipment receives a handover message from the CWMF, via the AMF and the base station, and performs a handover between the cellular network and a WLAN access point in the WLAN network based on handover parameters included in the received handover message.

BRIEF DESCRIPTION OF THE DRAWINGS

Aspects of managing mobility between a cellular network and a wireless local area network (WLAN) are described with reference to the following drawings. The same numbers are used throughout the drawings to reference like features and components.

DETAILED DESCRIPTION

Overview

This document describes improvements in mobility management for user equipment between cellular and WLAN (e.g., Wi-Fi) networks. A Cellular-WLAN Mobility Function (CWMF) is introduced to manage routing of packet data over cellular and WLAN networks to user equipment. The CWMF enables the transfer of packet data context between cellular and WLAN networks, improved handovers between cellular and WLAN networks, Quality of Service (QoS) management of WLAN networks, and aggregation of cellular and WLAN bandwidths to improve data throughput for user equipment.

The techniques described connect managed WLAN Access Points (APs) to an Authentication and Mobility Function (AMF) of a cellular network via the CWMF. The CWMF transfers a packet data context for the user equipment between the cellular and WLAN networks to reduce dropped packets and retransmissions during transitions of data traffic between the cellular network and the WLAN network. By managing a single IP context during handovers, as well as aggregations of cellular and WLAN, application layer entities do not need to track multiple IP contexts, as a single IP context is maintained through a handover between cellular and WLAN and for aggregations of cellular and WLAN.

The CWMF requests measurements of cellular and WLAN networks from the user equipment and WLAN APs, including alternative WLAN APs. The CWMF uses the measurements to determine when to trigger the handover of the user equipment between WLAN access points or between the cellular network and the WLAN network. The CWMF monitors the backhaul performance and Quality of Service (QoS) of WLAN networks and WLAN APs to determine if a particular WLAN AP is a good candidate to support data traffic to the user equipment or if the user equipment should be handed over to another WLAN AP or to the cellular network.

In aspects, managing mobility between a cellular network and a wireless local area network (WLAN) provides new interfaces, messages, and management functions to support coordination of communications between cellular and WLAN networks and to manage mobility of user equipment and data traffic of the user equipment between cellular and WLAN networks.

While features and concepts of the described systems and methods for managing mobility between a cellular network and a wireless local area network (WLAN) can be implemented in any number of different environments, systems, devices, and/or various configurations, aspects of managing mobility between a cellular network and a wireless local area network (WLAN) are described in the context of the following example devices, systems, and configurations.

Example Environment

Figure 1:
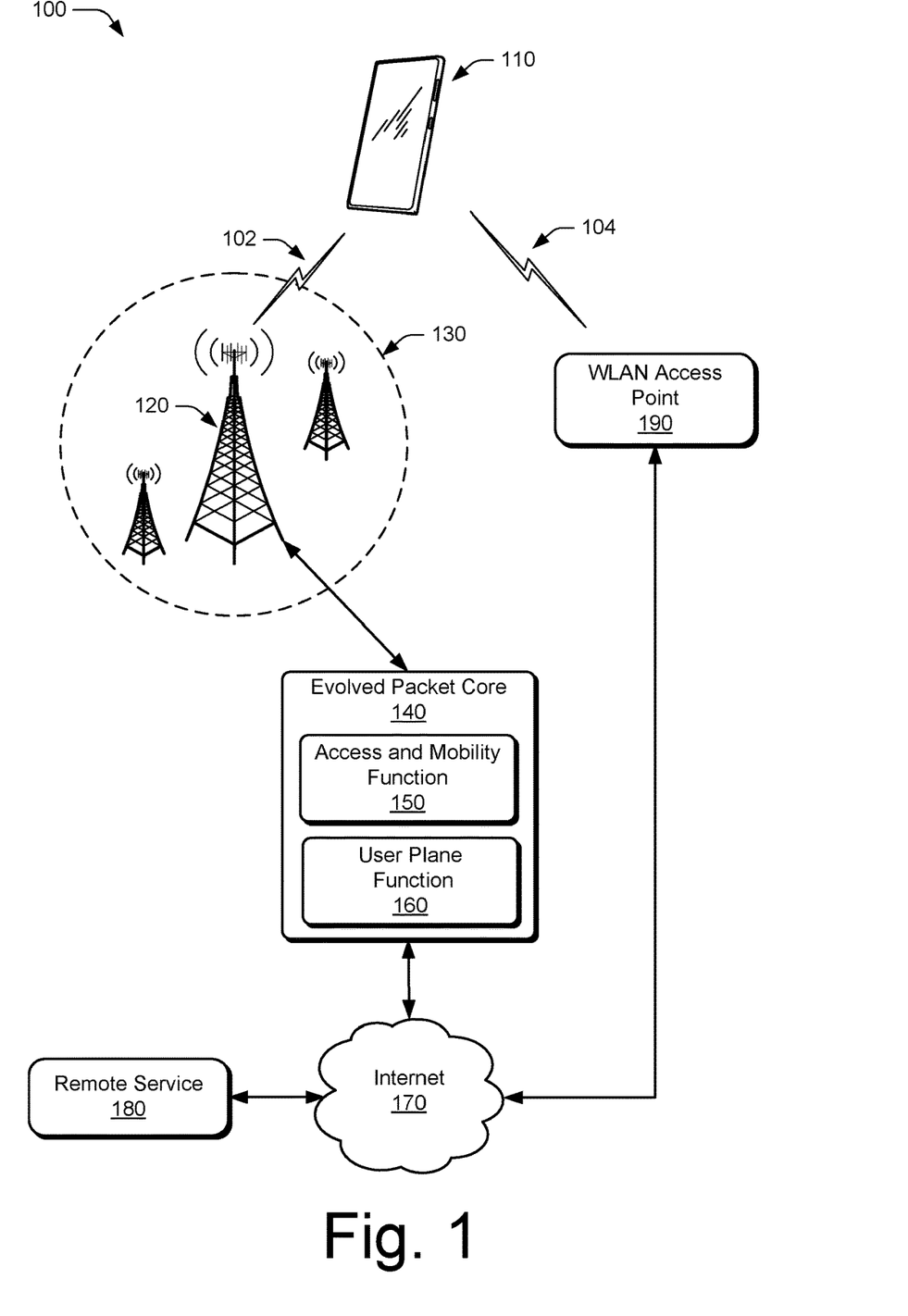
FIG. 1 illustrates an example wireless network environment in which various aspects of managing mobility between a cellular network and a wireless local area network (WLAN) can be implemented.

FIG. 1 illustrates an example environment 100, which includes a user equipment 110 (UE 110) that communicates with a base station 120 through a wireless communication link 102 (wireless link 102). In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base station 120 communicates with the user equipment 110 via the wireless link 102, which may be implemented as any suitable type of wireless link. The wireless link 102 can include a downlink of data and control information communicated from the base station 120 to the user equipment 110, an uplink of other data and control information communicated from the user equipment 110 to the base station 120, or both. The wireless link 102 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. The base station 120 and any additional base stations are collectively a Radio Access Network 130 (RAN 130, Evolved Universal Terrestrial Radio Access Network 130, or E-UTRAN 130), which are connected via an Evolved Packet Core 140 (EPC 140) network to form a wireless operator network.

The EPC 140 includes an Access and Mobility Function 150 (AMF 150) that provides control-plane functions such as registration and authentication of multiple user equipment 110, authorization, mobility management, or the like in a cellular network. The AMF 150 communicates with the base stations 120 in the RAN 130 and also communicates with multiple user equipment 110, via the base stations 120. The EPC 140 includes a User Plane Function 160 (UPF 160) that is a gateway to connect base stations 120 to the Internet 170. The EPC 140 may include additional features that are omitted from FIG. 1 for the sake of clarity. The user equipment 110 may connect, via the EPC 140, to public networks, such as the Internet 170 to interact with a remote service 180.

The user equipment 110 also can connect to the Internet 170 using a WLAN connection 104 to a WLAN access point 190 that is connected to the Internet 170. The WLAN access point 190 may be located in a user's home, an office, airport, coffee shop, and so forth. Each WLAN access point 190 may be independently operated, such as in a user's home, may be part of an enterprise network, or may be operated as part of a public network of WLAN access points operated by a wireless network operator. The WLAN wireless network operator may be the same as the operator of the RAN 130 or different than the operator of the RAN 130.

Figure 2:
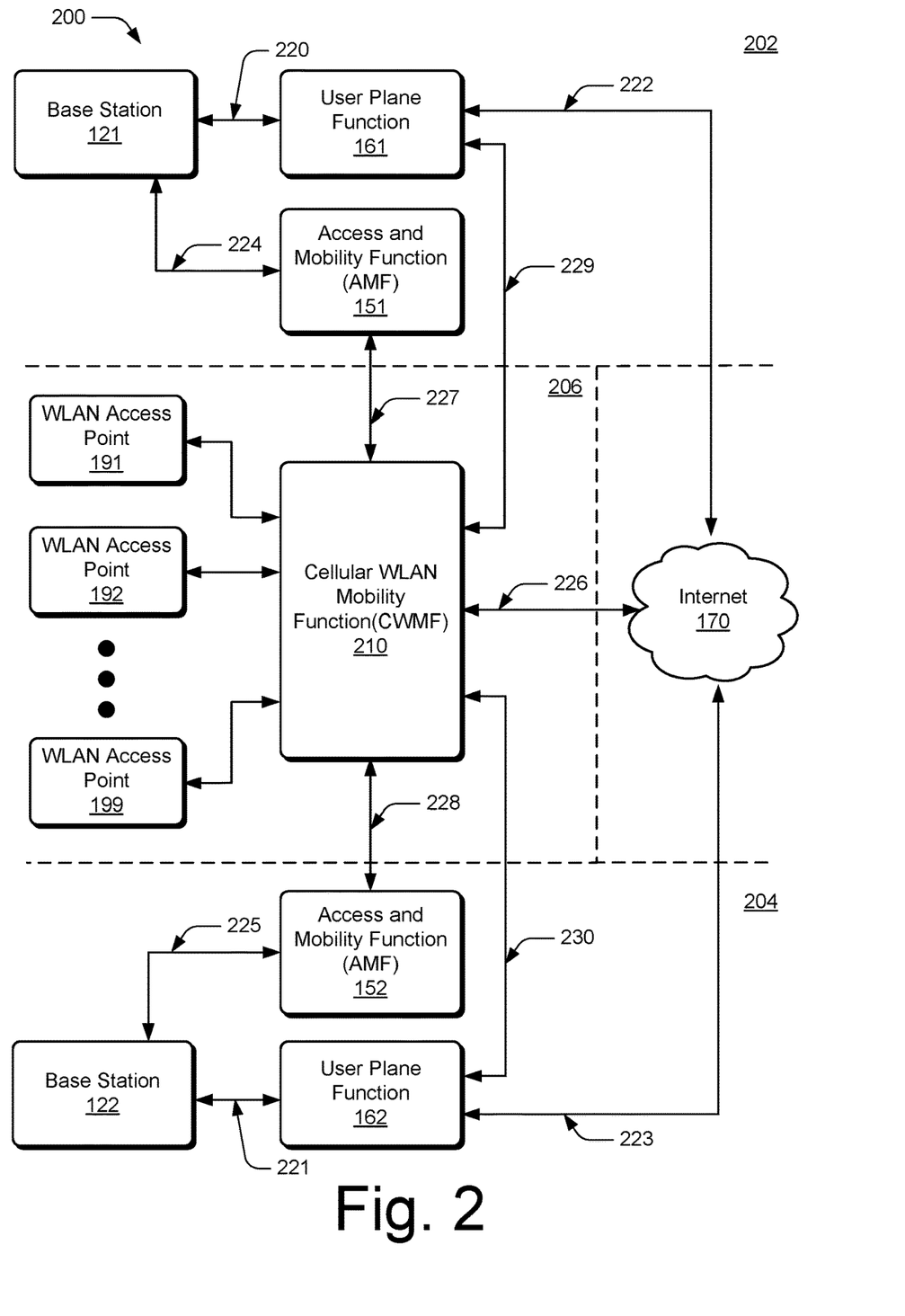
FIG. 2 illustrates an example environment as generally relating to cellular and WLAN networks that can implement various aspects of managing mobility between a cellular network and a wireless local area network (WLAN).

FIG. 2 illustrates an example environment 200 in which various aspects of managing mobility between a cellular network and a wireless local area network (WLAN) can be implemented. A first cellular network of a first wireless network operator is shown at 202, a second cellular network of a second wireless network operator is shown at 204, and a WLAN network is shown at 206.

Each cellular network includes multiple base stations 120. For the sake of clarity, a single base station 120 is illustrated for the first cellular network 202 as base station 121 and for the second cellular network as base station 122. Each cellular network includes a User Plane Function (UPF) 160, illustrated as UPF 161 and UPF 162, which is a gateway to connect base stations 120 to the Internet 170. Base stations 121 and 122 connect to UPF 161 and 162, respectively, via an NG3 interface, at 220 and 221, respectively. The UPF 161 and the UPF 162 connect to the Internet 170 via an NG6 interface, at 222 and 223, respectively. Each cellular network includes an Access and Mobility Function 150 (AMF 150) illustrated as AMF 151 and AMF 152. Base stations 121 and 122 connect to AMF 151 and 152, respectively, via an NG2 interface, at 224 and 225, respectively.

The WLAN network 206 includes multiple WLAN APs 190 illustrated as WLAN Access Points 191-199. The WLAN APs 191-199 are connected to a Cellular-WLAN Mobility Function 210 (CWMF 210), via a network connection that manages the WLAN APs 190-199 and routes data traffic for user equipment 110 in the WLAN network 206 to and from the Internet 170 via a WLAN user-plane data connection, at 226. The CWMF 210 is also connected to the AMF 150 of one or more cellular networks for control-plane signaling, such as the AMF 151 and the AMF 152, at 227 and 228, respectively. The CWMF 210 registers with an AMF 150 with a secure and authenticated connection to be a trusted CWMF. The CWMF 210 is also connected via secure and authenticated connections to the UPF 160 of one or more cellular networks for communication of user-plane data, such as the UPF 161 and the UPF 162, at 229 and 230, respectively. The secure and authenticated connections can be established using any suitable techniques such as certificate-based authentication, public or private key encryption, or the like.

Although illustrated as providing WLAN connectivity for the first cellular network and the second cellular network, the WLAN network 206 may provide WLAN connectivity to any number of cellular networks. Likewise, although the first cellular network 202 and the second cellular network 204 are illustrated as being connected to a single WLAN network 206, the first cellular network 202 and the second cellular network 204 may each be connected to any number of common or different WLAN networks, each including a CWMF 210.

Cellular-WLAN Mobility Operations

To overcome issues, such as dropped packets and retransmissions, that can arise when switching packet data traffic for the user equipment 110 from a cellular network to a WLAN network, the CWMF 210 manages the transfer of packet data context between a cellular network and a WLAN network. Context information for an IP session of the user equipment 110 includes context related to protocols such as Transmission Control Protocol (TCP), User Datagram Protocol (UDP) and/or Internet Protocol (IP), an IP address, user identity information, QoS parameters, port numbers, or the like. In aspects, when the IP session of the user equipment 110 is transferred from the cellular network 202 to the WLAN network 206, the context for an IP session is transferred from the cellular network 202 to the WLAN network 206 by the CWMF 210, which then routes data between the user equipment 110 and the Internet 170. The IP session information is maintained, such as maintaining a single IP address, throughout and after a handover, without creating an additional IP address to facilitate the handover.

Figure 3:
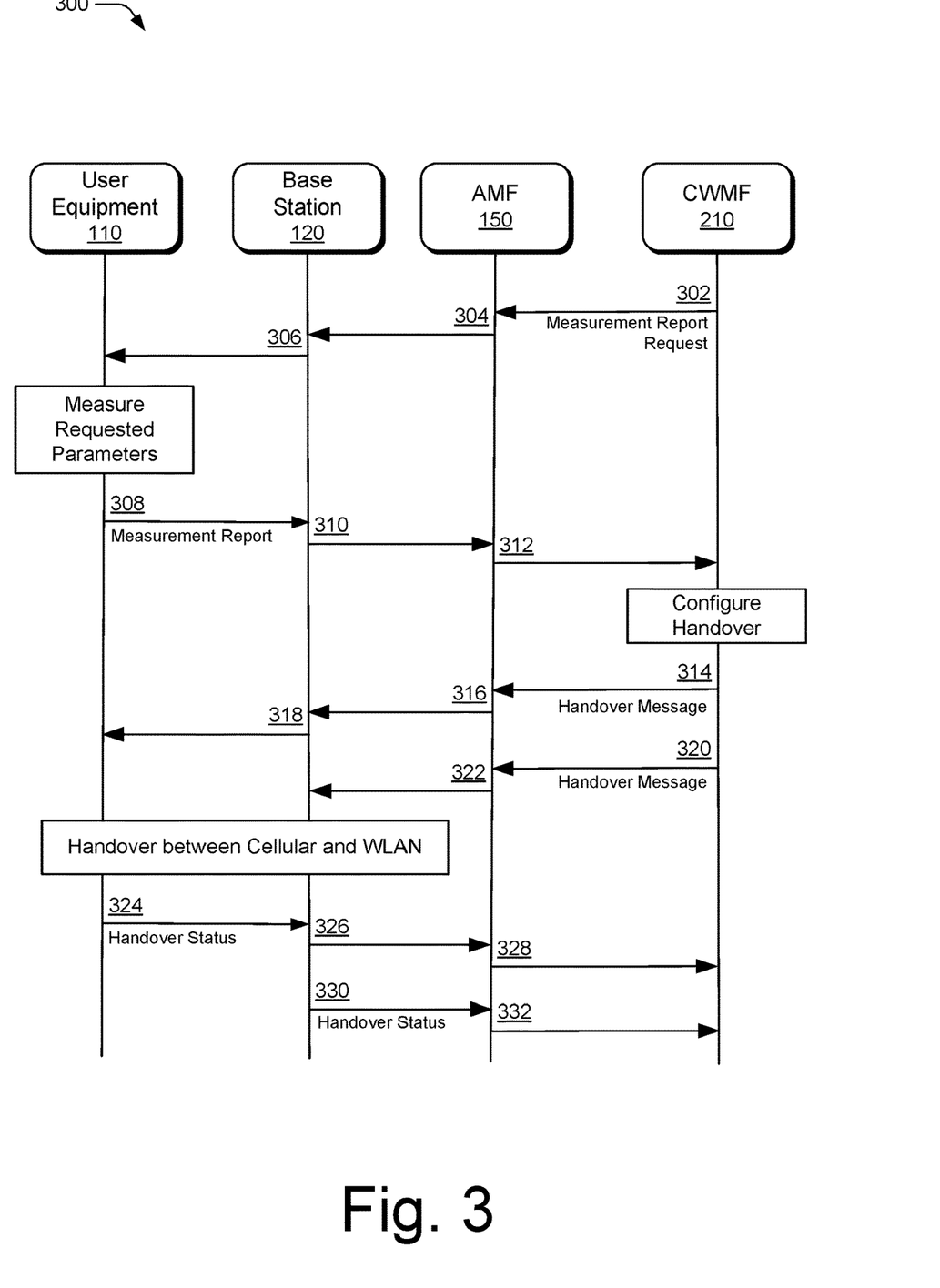
FIG. 3 illustrates example details of data and control transactions between devices of a handover between cellular and WLAN network in accordance with aspects of managing mobility between a cellular network and a wireless local area network (WLAN).

FIG. 3 illustrates details of example data and control transactions between devices engaged in a handover between a cellular network and a WLAN network in accordance with various aspects of managing mobility between a cellular network and a wireless local area network (WLAN). In aspects, the CWMF 210 can assist in the handover of the user equipment 110 between a cellular network and a WLAN network. The CWMF 210 can determine and communicate parameters for a handover to the user equipment 110 and via the AMF 150 to the base station 120. The parameters for the handover may include a timing of the handover, a target frequency or channel, a target bandwidth, a target cell or station identifier (e.g., BSSID, SSID, or ESS), a target access point configuration, a user equipment or station (STA) identity on the target access point, a radio configuration, a transmit power, a data Quality of Service (QoS) configuration, a security configuration (e.g., a security algorithm, a security strategy, security keys, security identities, security offsets or the like), a measurement configuration on the target station, or higher (Non-access stratum, NAS) layer configurations, or the like. The CWMF 210 can configure a measurement report for the user equipment 110 to determine metrics for the cellular network and the WLAN network to be measured by the user equipment 110. Based on the metrics, the CWMF 210 can determine when to initiate the handover.

In an example, the CWMF 210 sends a measurement report request to the user equipment 110, at 302, via the AMF 150 at 304 and the base station 120 at 306. The measurement report request includes parameters for measurement of the cellular and/or WLAN networks by the user equipment 110, such as link quality measurements, upper-layer metrics, a period of time over which to perform the measurements, a time interval between measurements, a number of measurement reports to provide, or the like. The CWMF 210 can include a number of WLAN APs 190 to measure that may include a WLAN AP 190 to which the user equipment 110 is currently connected, as well as other WLAN APs 190 that may be candidates to provide a WLAN connection to the user equipment 110. The user equipment 110 measures the requested parameters and provides one or more measurement reports to the CWMF 210, at 308, via the base station 120 at 310 and the AMF 150 at 312.

Based on the received measurement reports, the CWMF 210 determines whether or not to handover one or more bearers of the user equipment 110 to a WLAN AP 190 in the WLAN network 206. If the CWMF 210 determines the WLAN network 206 will provide the required QoS for the user equipment 110, the CWMF 210 sends a first handover message to the user equipment 110 at 314, via the AMF 150 at 316, and the base station 120 at 318. The CWMF 210 sends a second handover message to the base station 120 at 320, via the AMF 150 at 322. The handover message sent to the user equipment 110 may be sent via the cellular network or the WLAN network. The handover message includes parameters for the handover, such as a timing of when to perform the handover, target radio frequency, physical channel configuration, security configuration, target channel bandwidth, uplink power, target Service Station Identifier (SSID), or the like. Although this example describes a handover from cellular to WLAN, the described techniques apply equally to handovers of the user equipment 110 from a WLAN network to a cellular network.

At the time indicated for the handover, the user equipment 110 is handed over from the base station 120 of the cellular network to a WLAN AP 190 in the WLAN network 206. The user equipment 110 sends a handover status to the CWMF 210, at 324, via the base station 120 at 326 and the AMF 150 at 328. The base station 120 sends handover status to the CWMF 210, at 330, via the AMF 150 at 332. The handover status may include a handover complete or handover succeeded indication (sent to target access point), a log available or radio link failure information available indication (indicating that measurement data for a failed handover is available and is sent to the previous serving access point or base station), or a handover failure or rejection indication with an optional reason for the failure or rejection (sent to the previous serving access point or base station).

Figure 4:
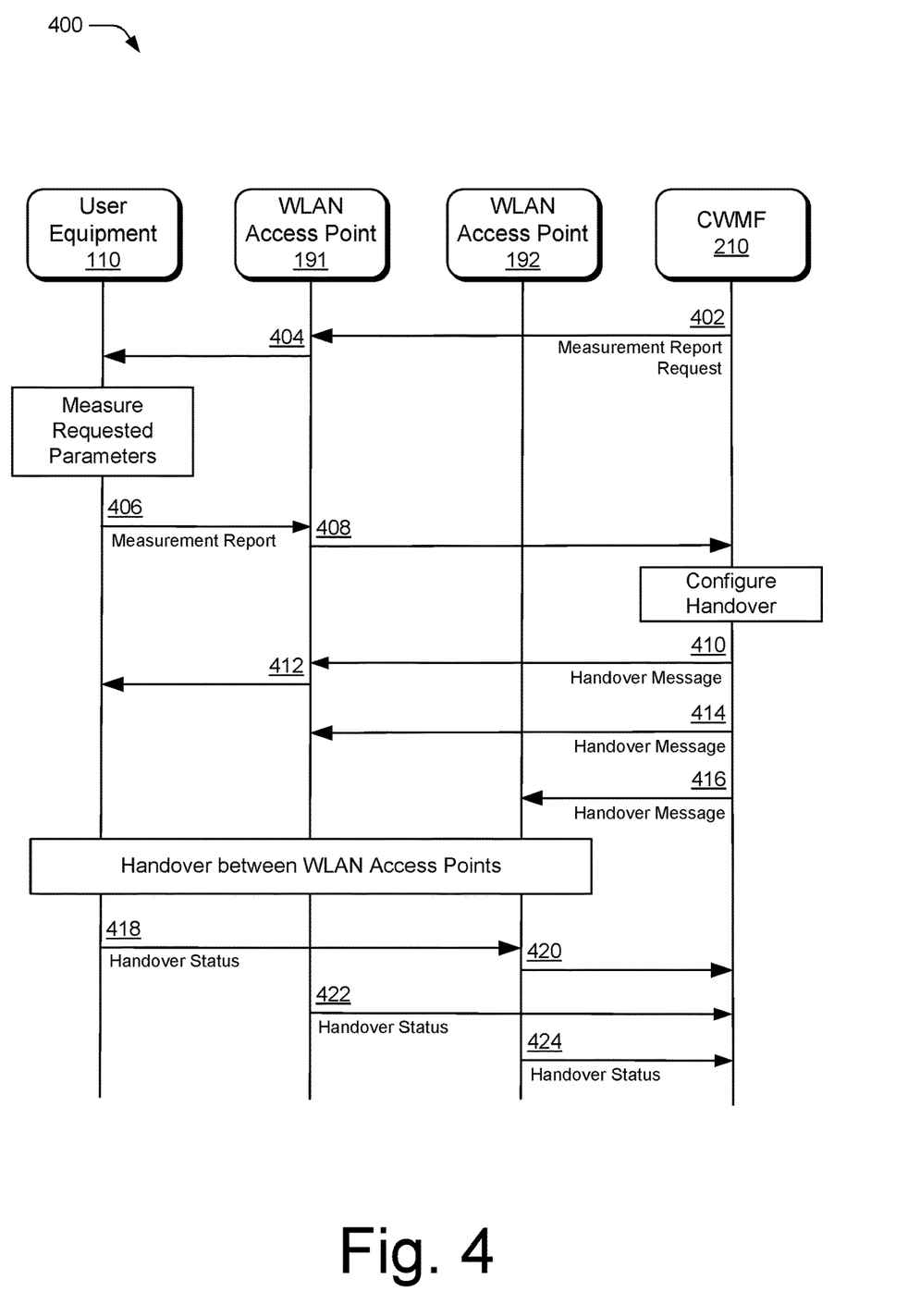
FIG. 4 illustrates example details of data and control transactions between devices of a handover between WLAN access points in accordance with aspects of managing mobility between a cellular network and a wireless local area network (WLAN).

FIG. 4 illustrates details of example data and control transactions between devices engaged in a handover between a first WLAN access point and a second WLAN access point in a WLAN network in accordance with various aspects of managing mobility between a cellular network and a wireless local area network (WLAN). In aspects, the CWMF 210 can manage the handover of the user equipment 110 from the first WLAN AP 191 to the second WLAN AP 192 in the WLAN network 206. The CWMF 210 can determine and communicate the parameters for the handover to the user equipment 110, the first WLAN AP 191, and the second WLAN AP 192. The CWMF 210 can configure a measurement report for the user equipment 110 to determine metrics of the first WLAN AP 191, and the second WLAN AP 192 to be measured by the user equipment 110. Based on the metrics, the CWMF 210 can determine the parameters for the handover.

In an example, the CWMF 210 sends a measurement report request to the user equipment 110 at 402, via the WLAN AP 191 at 404. The measurement report request includes parameters for measurement of WLAN APs 190 by the user equipment 110, such as link quality measurements, upper-layer metrics, a period of time over which to perform the measurements, a time interval between measurements, a number of measurement reports to provide, or the like. In the measurement report request the CWMF 210 can include a number of WLAN APs 190 to measure that may include the first WLAN AP 191 and the second WLAN AP 192, as well as other WLAN APs 190 that may be candidates to provide a WLAN connection to the user equipment 110. The user equipment 110 measures the requested parameters and provides one or more measurement reports to the CWMF 210 at 406, via the WLAN AP 191 at 408.

Based on the received measurement reports, the CWMF 210 determines whether or not to handover the user equipment 110 from the first WLAN AP 191 to the second WLAN AP 192. If the CWMF 210 determines the second WLAN AP 192 will provide the required QoS for the user equipment 110, the CWMF 210 sends a first handover message to the user equipment 110 at 410, via the WLAN AP 191 at 412, a second handover message to the first WLAN AP 191 at 414, and a third handover message to the second WLAN AP 192 at 416. The handover message includes parameters for the handover. The parameters for the handover may include a timing of the handover, a target frequency or channel, a target bandwidth, a target cell or station identifier (e.g., BSSID, SSID, or ESS), a target access point configuration, a user equipment or station (STA) identity on the target access point, a radio configuration, a transmit power, a data Quality of Service (QoS) configuration, a security configuration (e.g., a security algorithm, a security strategy, security keys, security identities, security offsets or the like), a measurement configuration on the target station, or higher (Non-access stratum, NAS) layer configurations, or the like.

At the time indicated for the handover, the user equipment 110 is handed over from the first WLAN AP 191 to the second WLAN AP 192. The user equipment 110 sends handover status to the CWMF 210 at 418, via the WLAN AP 192 at 420. The first WLAN AP 191 sends handover status to the CWMF 210 at 422, and the second WLAN AP 192 sends handover status to the CWMF 210 at 424. The handover status may include a handover complete or handover succeeded indication (sent to target access point), a log available or radio link failure information available indication (indicating that measurement data for a failed handover is available and is sent to the previous serving access point), or a handover failure or rejection indication with an optional reason for the failure or rejection (sent to the previous serving access point).

WLAN Network Management

In aspects, the CWMF 210 monitors the Quality of Service (QoS) provided by the WLAN network 206 and the individual WLAN APs 190 in the WLAN network 206. The CWMF 210 can use the monitored QoS parameters in handover decisions, as well as to manage and configure the WLAN APs 190. For example, the CWMF 210 can monitor QoS parameters of uplink and downlink communications by the WLAN APs 190 including TCP throughput, UDP throughput, IP throughput, dropped packet rates, packet retransmission rates, backhaul performance to the WLAN APs 190, latency between the WLAN APs 190 and the user equipment 110, measurements of the radio environment about the WLAN APs 190, or the like.

In a further aspect, the CWMF 210 can manage and configure the WLAN APs 190. For example, the CWMF 210 can configure the operating frequency or channel, the channel bandwidth, the transmit power, protocol filtering, or the like of a WLAN AP 190. The CWMF 210 may configure the WLAN APs 190 in various ways to optimize the performance of the WLAN network 206 by reducing interference between WLAN APs 190, load balancing traffic between WLAN APs 190, or the like. The CWMF 210 may implement aspects of Self-Organizing Networks (SON), such as automatically configuring a new WLAN AP 190 that is added to the WLAN network 206, automatically optimizing the configuration of WLAN APs 190, and/or healing the WLAN network 206 when one of the WLAN APs 190 fails or goes offline.

In another aspect, the CWMF 210 can manage the routing of packet data between WLAN and cellular networks to support aggregation of cellular and WLAN bandwidth to provide a user equipment 110 with higher data rates. For example, the CWMF 210 routes a first portion of data packets in an IP session to the user equipment 110 via the WLAN network 206 and a second portion of the data packets in the IP session via the cellular network 202 to the user equipment 110. The CWMF 210 may route the second portion of the data packets via the UPF 161, which is connected to the CWMF 210 by the user-plane data connection 229. The UPF 161 relays the second portion of the data packets to the user equipment 110 via the base station 121 over the NG3 interface 220. Alternatively, the AMF 151 may be used to forward user-plane data to the base station 121 over the connections 227 and 224 from the CWMF 210.

Example Device

Figure 5:
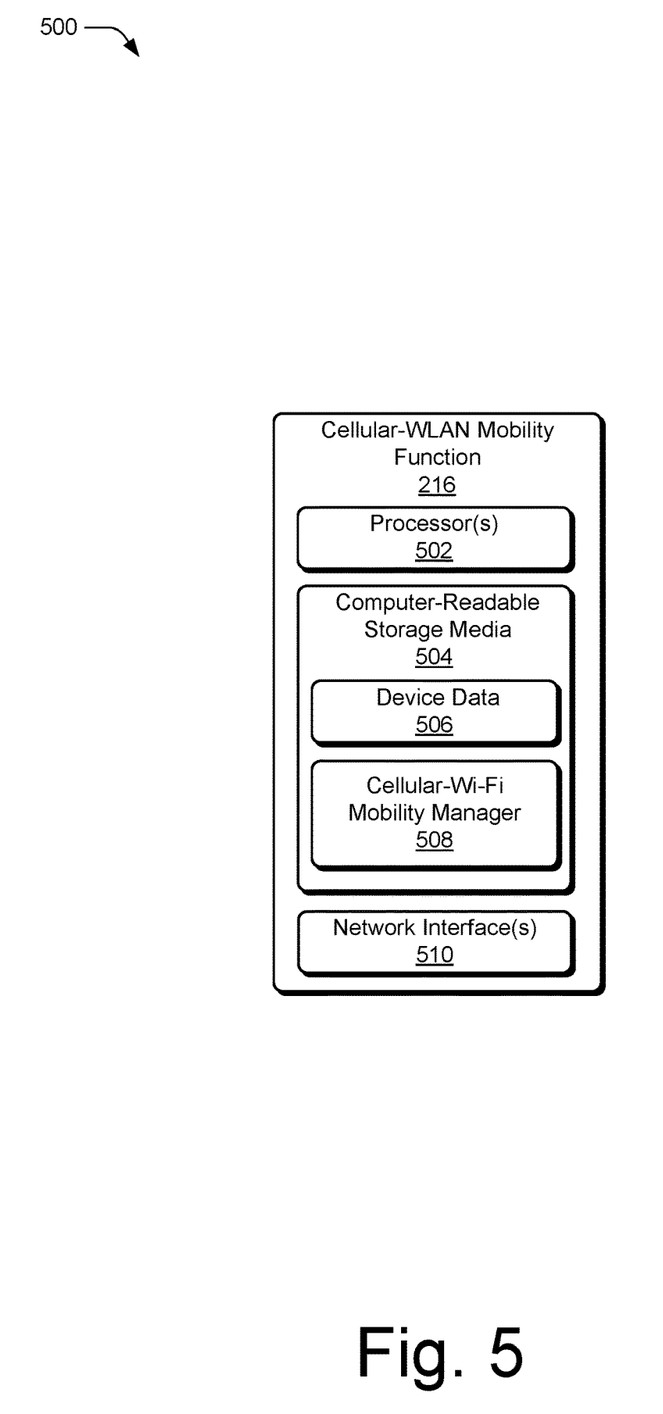
FIG. 5 illustrates an example device diagram for a device that can implement various aspects of managing mobility between a cellular network and a wireless local area network (WLAN).

FIG. 5 illustrates an example device diagram 500 of the CWMF 210. The CWMF 210 may include additional features that are omitted from FIG. 5 for the sake of clarity.

The device diagram for the CWMF 210 shown in FIG. 5 includes a single network node (e.g., a server). The functionality of the CWMF 210 may be distributed across multiple network nodes and/or devices and may be distributed in any fashion suitable to perform the functions described herein. The CWMF 210 includes processor(s) 502 and computer-readable storage media 504 (CRM 504). The processor 502 may be a single core processor or a multiple core processor composed of a variety of materials, such as silicon, polysilicon, high-K dielectric, copper, and so on. CRM 504 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 506 of the CWMF 210. The CRM 504 includes applications, such as a cellular-WLAN mobility manager application 508 to manage and control mobility of multiple user equipment 110 within the WLAN network 206 and/or between the cellular network 202 and the WLAN network 206, and/or an operating system of the CWMF 210, which are executable by processor(s) 502 to enable communication with the user equipment 110, the WLAN APs 190, and the AMF 150. The CWMF 210 includes one or more network interfaces 510 for communication with the WLAN APs 190, the AMF 150, the Internet 170, other devices in the EPC 140, the user equipment 110, and/or devices in the RAN 130.

Example Methods

Example methods 600-800 are described with reference to FIGS. 6-8 in accordance with one or more aspects of managing mobility between a cellular network and a wireless local area network (WLAN). The order in which the method blocks are described are not intended to be construed as a limitation, and any number of the described method blocks can be combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
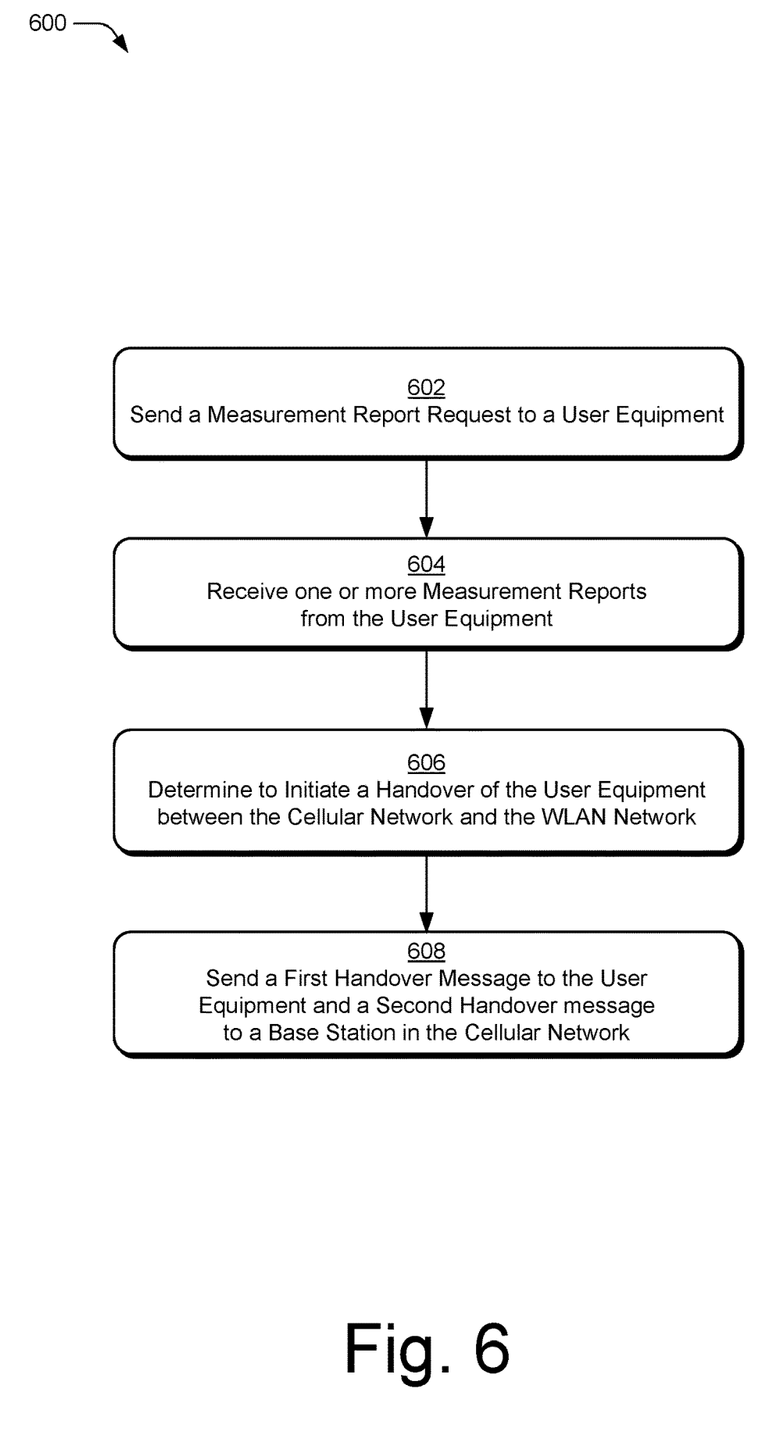
FIG. 6 illustrates an example method of managing mobility between a cellular network and a wireless local area network (WLAN) as generally related to a handover of a user equipment between a cellular network and a WLAN network in accordance with aspects of the techniques described herein.

FIG. 6 illustrates example method(s) 600 of managing mobility between a cellular network and a wireless local area network (WLAN) as generally related to a handover of the user equipment 110 between a cellular network and a WLAN network. At block 602, a Cellular-WLAN Mobility Function server sends a measurement report request to a user equipment, via an AMF and a base station. For example, the CWMF 210 sends a measurement report request to the user equipment 110, via the AMF 150 and the base station 120.

At block 604, the Cellular-WLAN Mobility Function server receives one or more measurement reports from the user equipment, via the base station and the AMF. For example, the CWMF 210 receives one or more measurements reports regarding the cellular network 202 and the WLAN network 206 from the user equipment 110, via the base station 120 and the AMF 150.

At block 606, based at least in part on the one or more measurement reports, the Cellular-WLAN Mobility Function server determines to initiate a handover of the user equipment from the cellular network to the WLAN network. For example, based on the one or more measurement reports, the CWMF 210 determines to initiate a handover of the user equipment 110 from the cellular network 202 to the WLAN network 206.

At block 608, the Cellular-WLAN Mobility Function server sends a first handover message to the user equipment, via the AMF and the base station, and a second handover message to the base station via the AMF in the cellular network, the first handover message and the second handover message being effective to cause the handover of the user equipment between the cellular network and the WLAN network. For example, the CWMF 210 sends a first handover message to the user equipment 110 via the AMF 150 and the base station 120, and sends a second handover message to the base station 120 via the AMF 150 in the cellular network 202, the first handover message and the second handover message being effective to cause the handover of the user equipment 110 between the cellular network 202 and the WLAN network 206.

Figure 7:
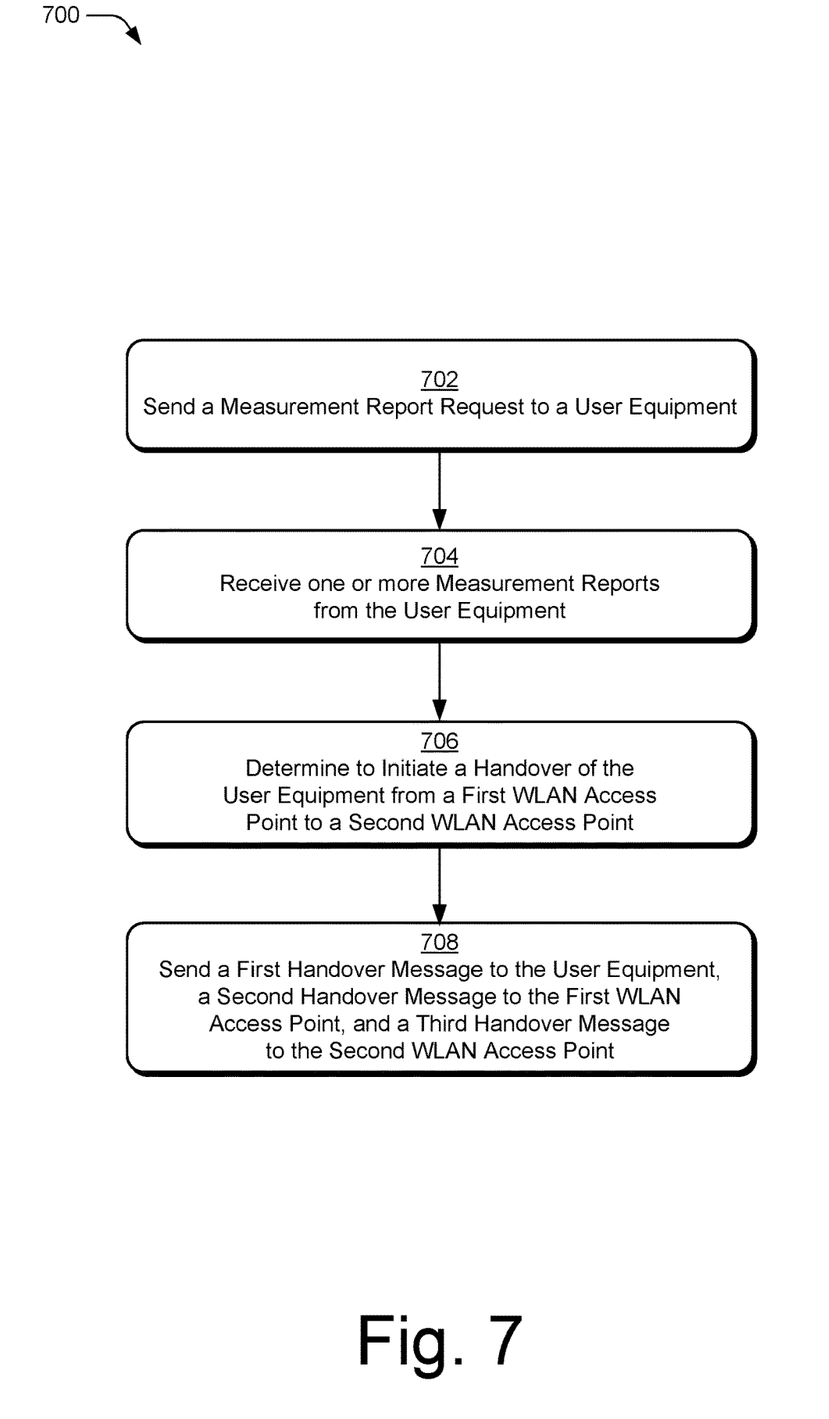
FIG. 7 illustrates an example method of managing mobility between a cellular network and a wireless local area network (WLAN) as generally related to a handover of a user equipment between WLAN access points in accordance with aspects of the techniques described herein.

FIG. 7 illustrates example method(s) 700 of managing mobility between a cellular network and a wireless local area network (WLAN) as generally related to a handover of the user equipment 110 between WLAN access points in a WLAN network. At block 702, a Cellular-WLAN Mobility Function server sends a measurement report request to a user equipment via a first WLAN access point. For example, the CWMF 210 sends a measurement report request to the user equipment 110 via the WLAN access point 191.

At block 704, the Cellular-WLAN Mobility Function server receives one or more measurement reports from the user equipment via the first WLAN access point. For example, the CWMF 210 receives one or more measurements reports from the user equipment 110 via the WLAN access point 191 regarding the WLAN access point 191 and the WLAN access point 192.

At block 706, based at least in part on the one or more measurements reports, the Cellular-WLAN Mobility Function server determines to initiate a handover of the user equipment from the first WLAN access point to the second WLAN access point. For example, based at least in part on the one or more measurement reports, the CWMF 210 determines to initiate a handover of the user equipment 110 from the WLAN access point 191 to the WLAN access point 192.

At block 708, the Cellular-WLAN Mobility Function server sends a first handover message to the user equipment via the first WLAN access point, sends a second handover message to the first WLAN access point, and sends a third handover message to the second WLAN access point, which is effective to cause the handover of the user equipment from the first WLAN access point to the second WLAN access point. For example, the CWMF 210 sends a first handover message to the user equipment 110 via the WLAN access point 191, sends a second handover message to the WLAN access point 191, and sends a third handover message to the WLAN access point 192, which is effective to cause the handover of the user equipment 110 from the WLAN access point 191 to the WLAN access point 192.

Figure 8:
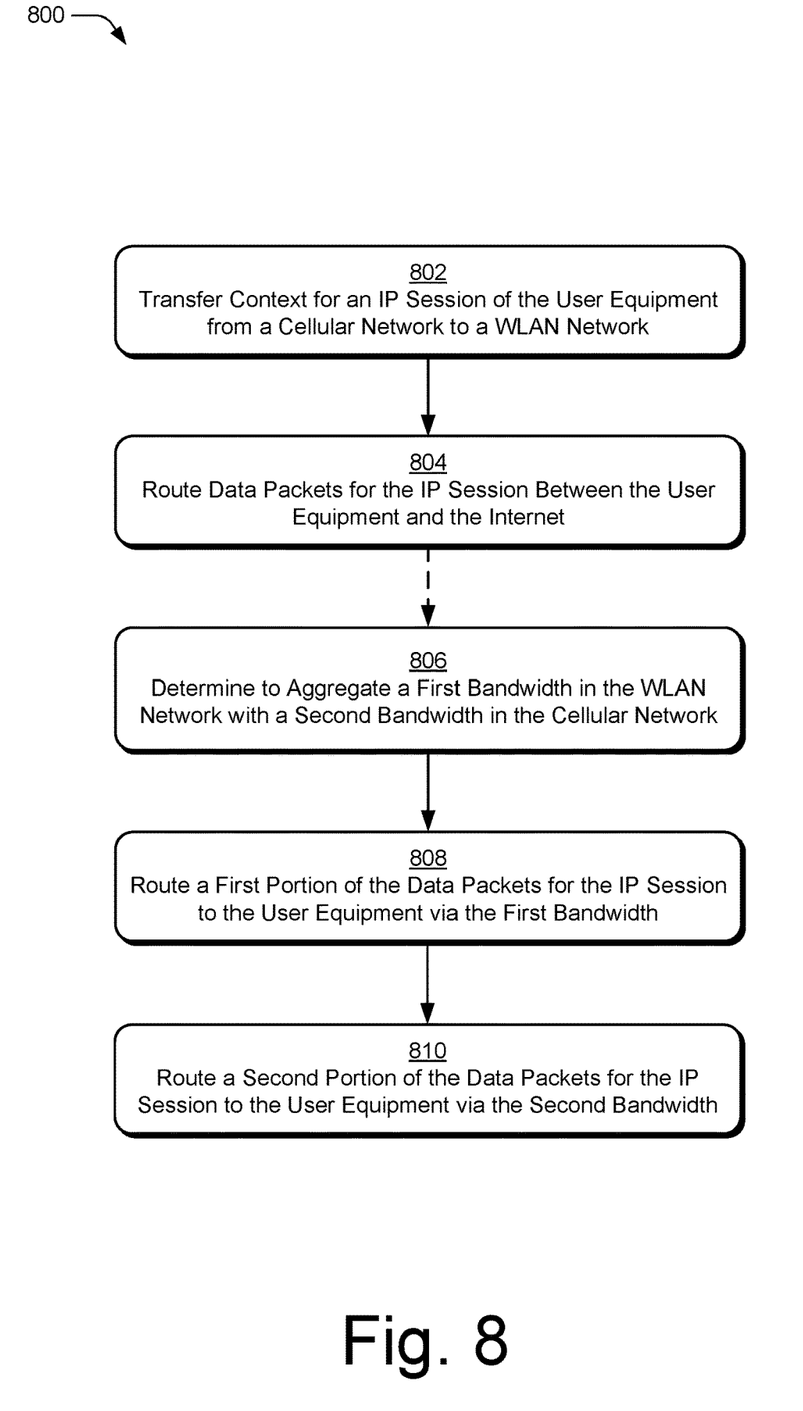
FIG. 8 illustrates an example method of managing mobility between a cellular network and a wireless local area network (WLAN) as generally related to packet data routing in accordance with aspects of the techniques described herein.

FIG. 8 illustrates example method(s) 800 of managing mobility between a cellular network and a wireless local area network (WLAN) as generally related to managing packet data context and routing packet data for the user equipment 110. At block 802, a Cellular-WLAN Mobility Function server transfers context for an IP session of a user equipment from a cellular network to a WLAN network, maintaining the IP session context throughout and after a handover from the cellular network to the WLAN network. For example, the CWMF 210 transfers context for an IP session of the user equipment 110 from the cellular network 202 to the WLAN network 206.

At block 804, the Cellular-WLAN Mobility Function routes packets for the IP session between the user equipment and the Internet, via the WLAN network. For example, the CWMF 210 routes packets for the IP session between the user equipment 110 and the Internet 170, via the WLAN network 206.

Optionally starting at block 806, the Cellular-WLAN Mobility Function determines to aggregate a first bandwidth in the WLAN network with a second bandwidth in the cellular network. For example, to provide higher data throughput for the IP session, the CWMF 210 determines to aggregate a first bandwidth in the WLAN network 206 with a second bandwidth in the cellular network 202.

At block 808, the Cellular-WLAN Mobility Function routes a first portion of the data packets for the IP session via the first bandwidth, by forwarding the first portion of the data packets to the user equipment via a WLAN access point. For example, the CWMF 210 routes a first portion of the data packets for the IP session to the user equipment 110 via the first bandwidth, by forwarding the first portion of the data packets to the user equipment 110 via the WLAN access point 191 in the WLAN network 206.

At block 810, the Cellular-WLAN Mobility Function routes a second portion of the data packets for the IP session via the second bandwidth, by forwarding the second portion of the data packets to the user equipment via a User Plane Function and a base station. For example, the CWMF 210 routes a second portion of the data packets for the IP session to the user equipment 110 via the second bandwidth, by forwarding the second portion of the data packets to the user equipment 110 via the UPF 161 and the base station 121 in the cellular network 202.

Although aspects of managing mobility between a cellular network and a wireless local area network (WLAN) have been described in language specific to features and/or methods, the subject of the appended claims is not necessarily limited to the specific features or methods described. Appended claims including a list of features that can be selected in "any combination thereof" includes combining any number and any combination of the listed features. Rather, the specific features and methods are disclosed as example implementations of managing mobility between a cellular network and a wireless local area network (WLAN) and other equivalent features and methods are intended to be within the scope of the appended claims. Further, various different aspects are described, and it is to be appreciated that each described aspect can be implemented independently or in connection with one or more other described aspects.

What is claimed is:

1. A method of managing mobility of a user equipment between a wireless local area network (WLAN) and a cellular network, the method comprising:
   sending, by a Cellular-WLAN Mobility Function (CWMF) server, a measurement report request to the user equipment via an Access and Mobility Function (AMF) and a base station;
   receiving, at the CWMF server, one or more measurement reports from the user equipment, via the base station and the AMF;
   determining, by the CWMF server and based at least in part on the one or more measurement reports, to initiate handover of the user equipment between the cellular network and the WLAN network;
   sending a first handover message to the user equipment, via the AMF and the base station;
   sending a second handover message to the base station, via the AMF, the first handover message and the second handover message being effective to cause the handover of the user equipment between the cellular network and a first WLAN access point in the WLAN network;
   transferring context for an Internet Protocol (IP) session of the user equipment, by the CWMF server, between the cellular network and the WLAN network;
   determining, by the CWMF server, to aggregate a first bandwidth in the WLAN network with a second bandwidth in the cellular network for the IP session;
   routing a first portion of data packets for the IP session to the user equipment using the first bandwidth, via the first WLAN access point in the WLAN network; and
   routing a second portion of the data packets for the IP session to the user equipment via the second bandwidth, via a User Plane Function (UPF) and the base station in the cellular network.

2. The method of claim 1, comprising:
   monitoring, by the CWMF server, one or more Quality of Service (QoS) parameters of the WLAN network; and
   based on the monitoring, reconfiguring one or more WLAN access points in the WLAN network to change a measured value of one of the at least one of the QoS parameters of the WLAN network.

3. The method of claim 2, wherein the at least one QoS parameter includes: a Transmission Control Protocol (TCP) throughput, a User Datagram Protocol (UDP) throughput, and Internet Protocol (IP) throughput, a dropped packet rate, a packet retransmission rate, a latency between a WLAN access point and the user equipment, or any combination thereof.

4. The method of claim 2, comprising:
   based on the monitoring one or more QoS parameters, determining to initiate an additional handover of the user equipment between the WLAN network and the cellular network;
   sending a third handover message to the user equipment, via the first WLAN access point; and
   sending a fourth handover message to the base station via the AMF,
   the third handover message and the fourth handover message being effective to cause the additional handover of the user equipment between the WLAN network and the cellular network.

5. The method of claim 2, comprising:
   based on the monitoring one or more QoS parameters, determining to initiate an additional handover of the user equipment from the first WLAN access point to a second WLAN access point in the WLAN network; and
   sending a fifth handover message to the user equipment, via the first WLAN access point; and
   sending a sixth handover message to the second WLAN access point,
   the fifth handover message and the sixth handover message being effective to cause the additional handover of the user equipment from the first WLAN access point to the second WLAN access point in the WLAN network.

6. The method of claim 5, comprising:
   sending, by the CWMF server, an additional measurement report request to the user equipment, via the second WLAN access point, to measure at least the first WLAN access point and the second WLAN access point in the WLAN network;
   receiving, from the user equipment via the second WLAN access point, an additional measurement report including measurements of the first WLAN access point and the second WLAN access point; and
   determining by the CWMF server and based at least in part on the additional measurement report, to initiate handover of the user equipment between the second WLAN access point and the first WLAN access point in the WLAN network.

7. The method of claim 1, further comprising:
receiving, by the CWMF server, a first handover status from the user equipment, via the base station and the AMF; and
receiving, by the CWMF server, a second handover status from the base station, via the AMF.

8. The method of claim 1, wherein the measurement report request includes one or more measurement parameters for measurement of the cellular network, the WLAN network, or both.

9. A Cellular-Wireless Local Area Network (WLAN) Mobility Function (CWMF) server device comprising:
one or more processors; and
a memory comprising instructions for a Cellular-WLAN Mobility Manager application, the instructions executable by the one or more processors to configure the one or more processors to:
send a measurement report request to a user equipment, via an Access and Mobility Function (AMF) and a base station;
receive one or more measurement reports from the user equipment, via the base station and the AMF;
determine, based at least in part on the one or more measurement reports, to initiate handover of the user equipment between a cellular network and a WLAN network; and
send a first handover message to the user equipment, via the AMF and the base station;
send a second handover message to the base station via the AMF,
the sending the first handover message and the second handover message being effective to cause the handover of the user equipment between the cellular network and a first WLAN access point in the WLAN network;
transfer context for an Internet Protocol (IP) session of the user equipment from the cellular network to the WLAN network;
determine to aggregate a first bandwidth in the WLAN network with a second bandwidth in the cellular network for the IP session;
route a first portion of data packets for the IP session to the user equipment using the first bandwidth, via the first WLAN access point in the WLAN network; and
route a second portion of the data packets for the IP session to the user equipment via the second bandwidth, via a User Plane Function (UPF) and the base station in the cellular network.

10. The CWMF server device of claim 9, the instructions executable by the one or more processors to configure the one or more processors to:
monitor one or more Quality of Service (QoS) parameters of the WLAN network; and
based on the monitoring, reconfigure one or more WLAN access points in the WLAN network to change a measured value of one of the at least one of the QoS parameters of the WLAN network.

11. The CWMF server device of claim 9, the instructions executable by the one or more processors to configure the one or more processors to:
send an additional measurement report request to the user equipment, via the first WLAN access point, to measure at least the first WLAN access point and a second WLAN access point in the WLAN network;
receive, from the user equipment via the first WLAN access point, an additional measurement report including measurements of the first WLAN access point and the second WLAN access point;
determine, based at least in part on the additional measurement report, to initiate handover the user equipment between the first WLAN access point and the second WLAN access point in the WLAN network; and
send an additional handover message to the user equipment via the first WLAN access point, to the first WLAN access point, and to the second WLAN access point,
the sending being effective to cause an additional handover of the user equipment from the first WLAN access point to the second WLAN access point in the WLAN network.

12. The CWMF server device of claim 9, wherein the measurement report request includes one or more measurement parameters for measurement of the cellular network, the WLAN network, or both.

13. The CWMF server device of claim 10, wherein the at least one QoS parameter includes: a Transmission Control Protocol (TCP) throughput, a User Datagram Protocol (UDP) throughput, and Internet Protocol (IP) throughput, a dropped packet rate, a packet retransmission rate, a latency between a WLAN access point and the user equipment, or any combination thereof.

14. The CWMF server device of claim 10, the instructions executable by the one or more processors to configure the one or more processors to:
based on the monitoring of the one or more QoS parameters, determine to initiate an additional handover of the user equipment between the WLAN network and the cellular network;
send a third handover message to the user equipment, via the first WLAN access point; and
send a fourth handover message to the base station via the AMF,
the third handover message and the fourth handover message being effective to cause the additional handover of the user equipment between the WLAN network and the cellular network.

15. The CWMF server device of claim 10, the instructions executable by the one or more processors to configure the one or more processors to:
based on the monitoring of the one or more QoS parameters, determine to initiate an additional handover of the user equipment from the first WLAN access point to a second WLAN access point in the WLAN network; and
send a fifth handover message to the user equipment, via the first WLAN access point; and
send a sixth handover message to the second WLAN access point,
the fifth handover message and the sixth handover message being effective to cause the additional handover of the user equipment from the first WLAN access point to the second WLAN access point in the WLAN network.

16. A method of managing mobility of a user equipment between a WLAN network and a cellular network, the method comprising:
receiving a measurement report request, from a Cellular-WLAN Mobility Function (CWMF) via a base station and an Access and Mobility Function (AMF);

sending one or more measurement reports to the Cellular-WLAN Mobility Function (CWMF), via die base station and die Access and Mobility Function (AMF);

receiving, by the user equipment, a handover message from the CWMF via the AMF and the base station; and performing a handover between the cellular network and a WLAN access point in the WLAN network based on handover parameters included in the received handover message;

receiving, by the user equipment via the WLAN access point, a first portion of data packets for an Internet Protocol (IP) session from the CWMF via a first bandwidth in the WLAN network; and receiving, by the user equipment via a User Plane Function (UPF) and the base station, a second portion of the data packets for the IP session from the CWMF via a second bandwidth in the cellular network, the second bandwidth being aggregated with the first bandwidth.

17. The method of claim 16, wherein the measurement report request includes one or more measurement parameters for measurement of the cellular network, the WLAN network, or both.

18. The method of claim 16, further comprising:
reporting a status of the handover to the CWMF, via the WLAN access point in the WLAN network.

19. The method of claim 16, further comprising:
sending, by the user equipment, one or more additional measurement reports to the CWMF, via the WLAN access point;

receiving, by the user equipment, an additional handover message from the CWMF via the WLAN access point; and performing an additional handover between the WLAN network and the cellular network.

20. The method of claim 16, further comprising:
receiving, by the user equipment via the WLAN access point, an additional handover message from the CWMF; and performing an additional handover from the WLAN access point in the WLAN network to another WLAN access point in the WLAN network.

21. The method of claim 17, further comprising:
receiving a second handover message via the first WLAN access point; and based on the second handover message, performing an additional handover from the first WLAN access point to a second WLAN access point.

* * * * *

UNITED STATES PATENT AND TRADEMARK OFFICE
CERTIFICATE OF CORRECTION

| | | |
|---|---|---|
| PATENT NO. | : 10,764,813 B2 | |
| APPLICATION NO. | : 16/054848 | |
| DATED | : September 1, 2020 | |
| INVENTOR(S) | : Erik Richard Stauffer et al. | |

It is certified that error appears in the above-identified patent and that said Letters Patent is hereby corrected as shown below:

Please delete patent 10,764,813 in its entirety and insert patent 10,764,813 B2 in its entirety.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

(12) United States Patent (10) Patent No.: US 10,764,813 B2
Stauffer et al. (45) Date of Patent: Sep. 1, 2020

(54) MANAGING MOBILITY BETWEEN A CELLULAR NETWORK AND A WIRELESS LOCAL AREA NETWORK (WLAN)

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/054,848

(22) Filed: Aug. 3, 2018

(65) Prior Publication Data
US 2020/0045612 A1 Feb. 6, 2020

(51) Int. Cl.
*H04W 40/36* (2009.01)
*H04W 36/00* (2009.01)
*H04W 24/10* (2009.01)
*H04W 8/08* (2009.01)

(52) U.S. Cl.
CPC .......... *H04W 40/36* (2013.01); *H04W 8/087* (2013.01); *H04W 24/10* (2013.01); *H04W 36/0016* (2013.01); *H04W 36/0022* (2013.01); *H04W 36/0044* (2013.01); *H04W 36/0088* (2013.01)

(58) Field of Classification Search
CPC ..... H04W 40/36; H04W 8/087; H04W 24/02; H04W 24/06; H04W 24/10; H04W 36/0016; H04W 36/0022; H04W 36/0044; H04W 36/0088
USPC .................................................. 370/331–332
See application file for complete search history.

(56) References Cited

U.S. PATENT DOCUMENTS

| | | | |
|---|---|---|---|
| 2016/0366720 A1* | 12/2016 | Wu | H04W 28/0236 |
| 2017/0171782 A1* | 6/2017 | Mohamed | H04W 36/0011 |
| 2018/0167859 A1* | 6/2018 | Wu | H04W 76/19 |
| 2018/0255496 A1* | 9/2018 | Kim | H04W 36/30 |
| 2018/0270682 A1* | 9/2018 | Zacharias | H04W 24/10 |
| 2018/0279193 A1* | 9/2018 | Park | H04W 36/08 |
| 2019/0159090 A1* | 5/2019 | Keller | H04W 36/12 |
| 2019/0182841 A1* | 6/2019 | Soldati | H04W 24/10 |

(Continued)

FOREIGN PATENT DOCUMENTS

| | | |
|---|---|---|
| CN | 101841880 | 9/2010 |
| WO | 2018017477 | 1/2018 |
| WO | 2018128494 | 7/2018 |

OTHER PUBLICATIONS

"3GPP TR 23.793 V0.5.0", 3GPP TR 23.793 V0.5.0 (Jun. 2018), Jun. 2018, 68 pages.

(Continued)

*Primary Examiner* — Candal Elpenord
(74) *Attorney, Agent, or Firm* — Colby Nipper PLLC

(57) ABSTRACT

This document describes improvements in mobility management for user equipment (110) between a cellular network (202) and a WLAN network (206). A Cellular-WLAN Mobility Function (210) is introduced to manage routing of packet data over the cellular network (202) and the WLAN network (206) to the user equipment (110). The CWMF (210) enables the transfer of packet data context between the cellular network (202) and the WLAN network (206), improved handovers between the cellular network (202) and the WLAN network (206), Quality of Service (QoS) management of the WLAN network (206), and aggregation of cellular and WLAN bandwidths to improve data throughput for user equipment 110.

21 Claims, 8 Drawing Sheets

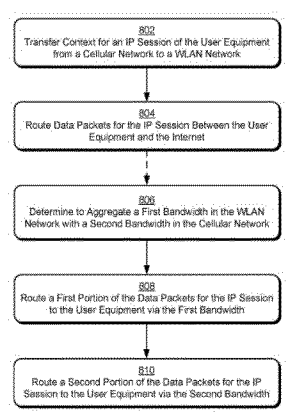

(56) References Cited

U.S. PATENT DOCUMENTS

2019/0191330 A1 * 6/2019 Dao .................... H04L 12/4633
2019/0306068 A1 * 10/2019 Kiss .................... H04W 60/00

OTHER PUBLICATIONS

"International Search Report and Written Opinion", PCT Application No. PCT/US2019/043697, dated Sep. 10, 2019, 18 pages.

* cited by examiner

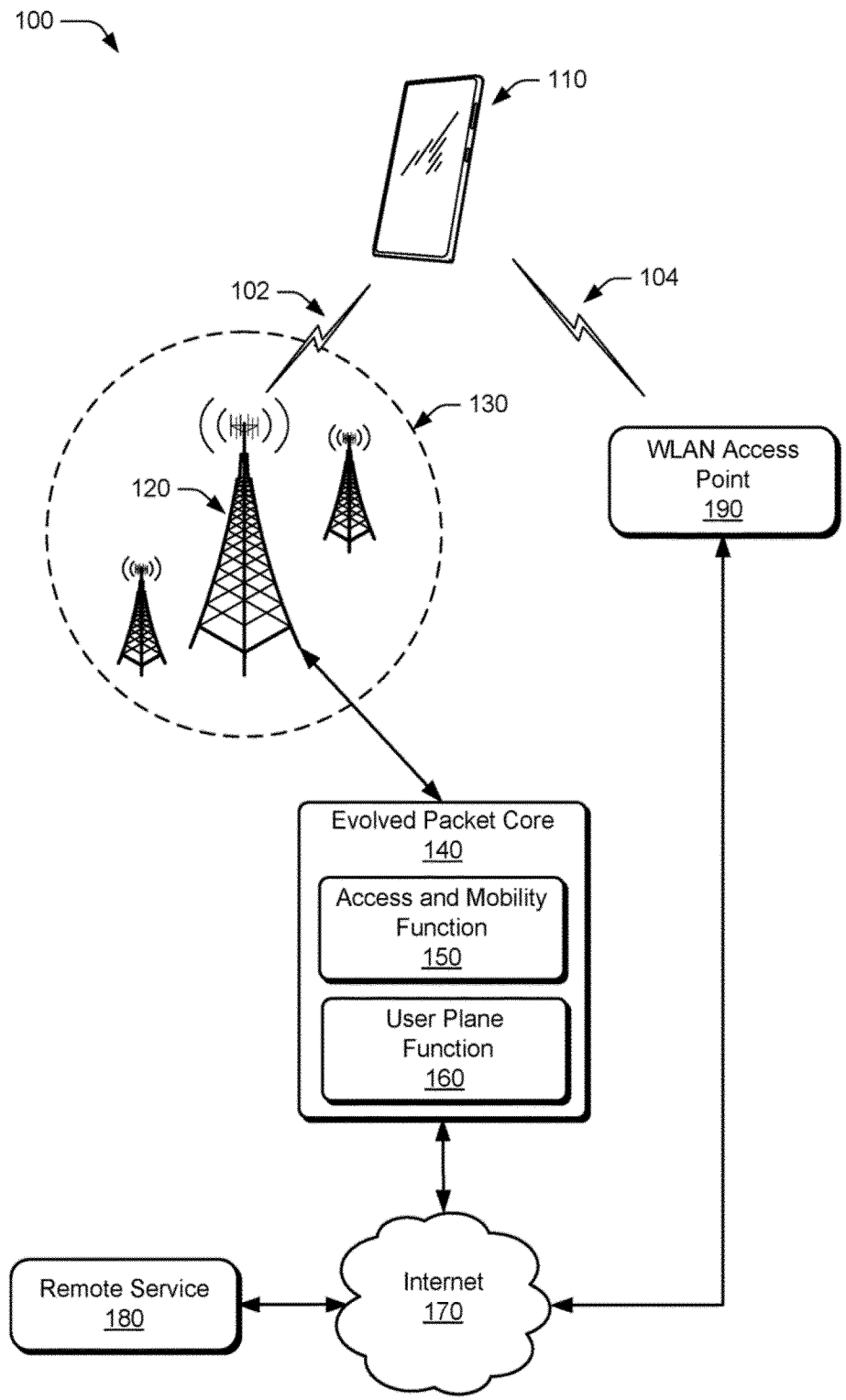
Fig. 1

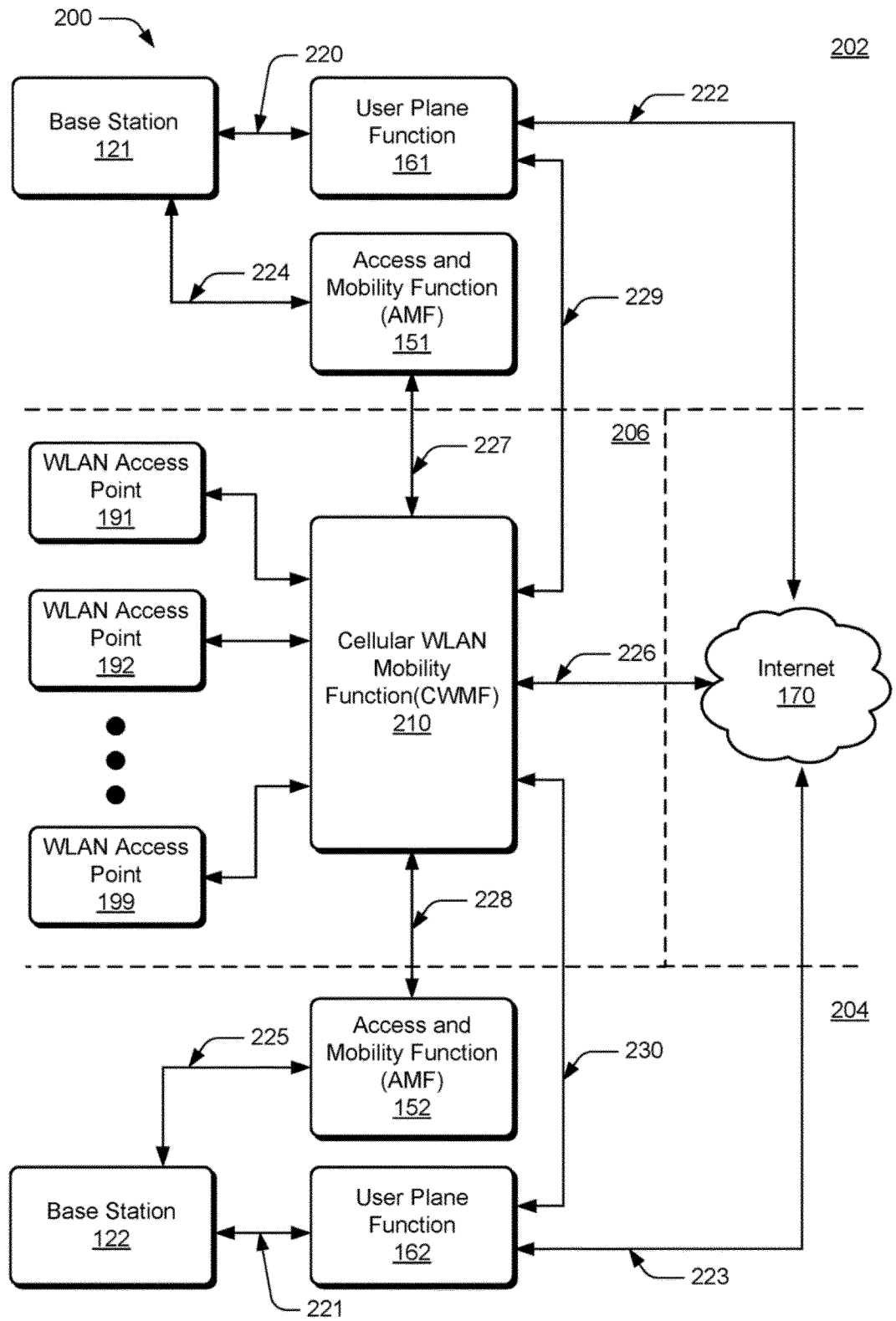
Fig. 2

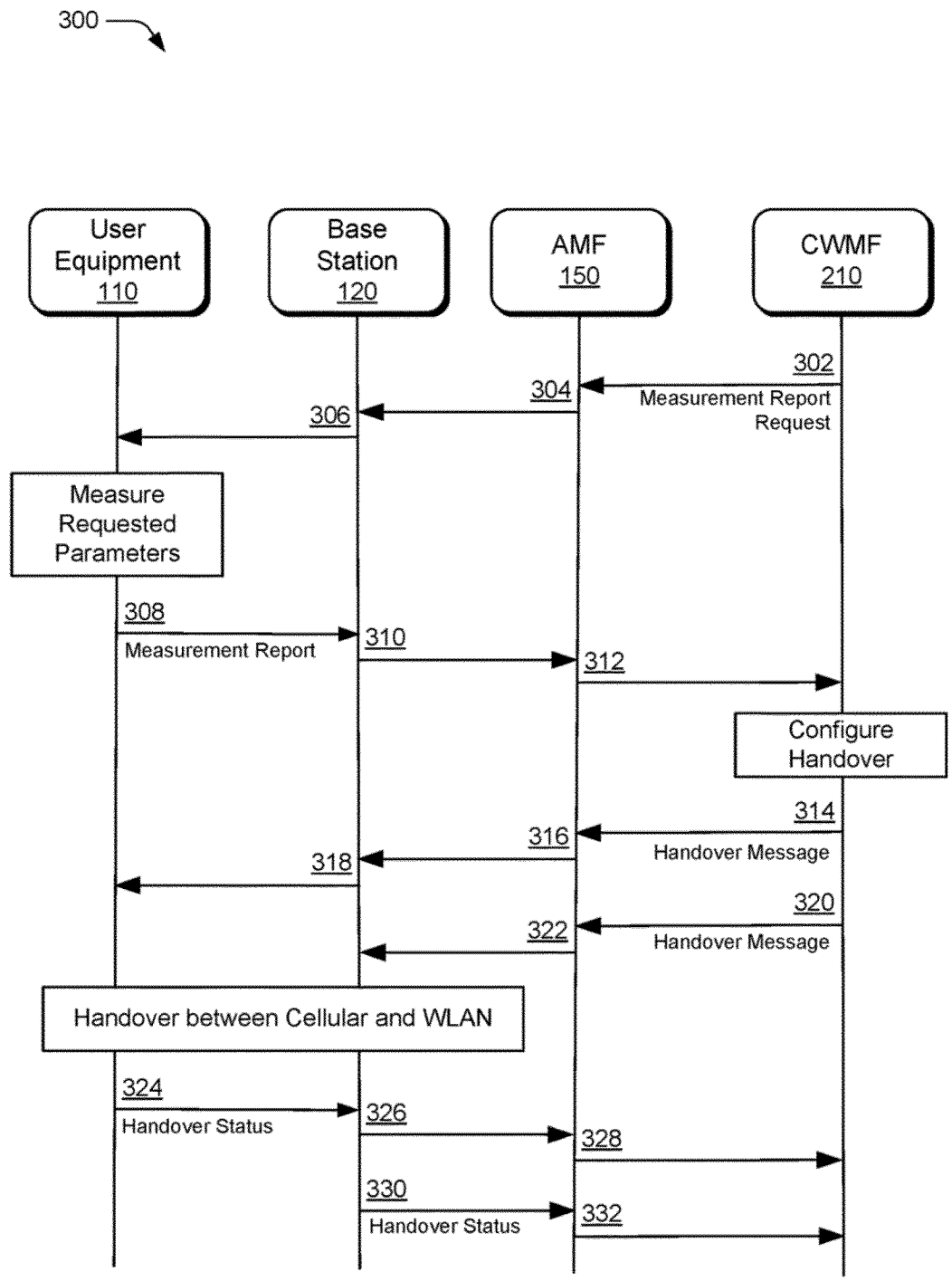
Fig. 3

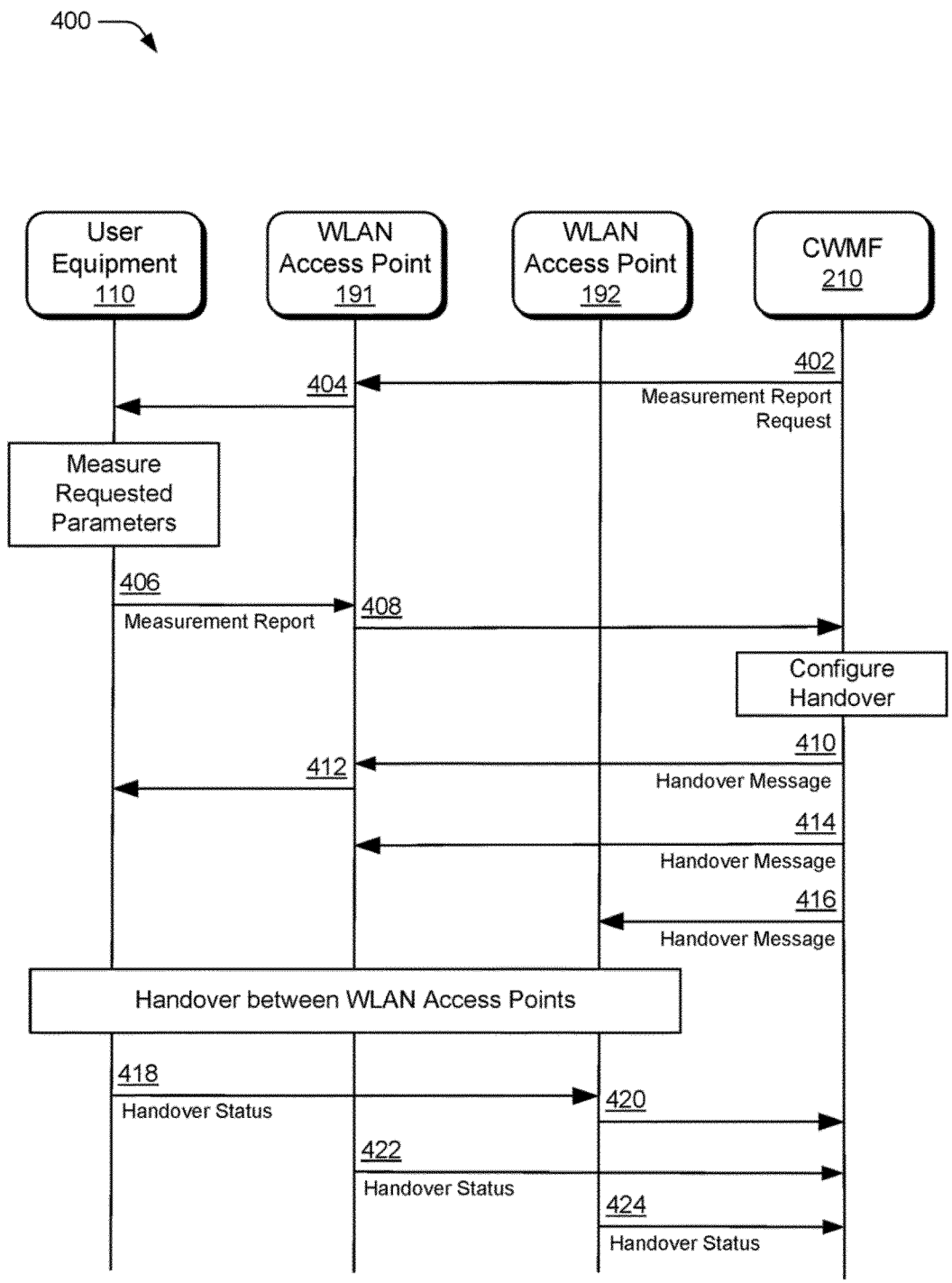
Fig. 4

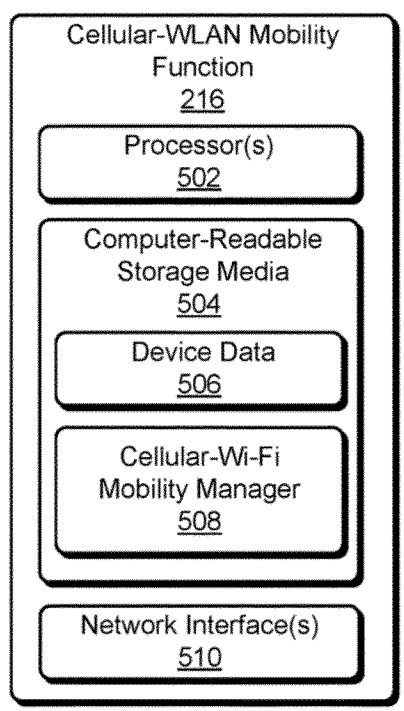
Fig. 5

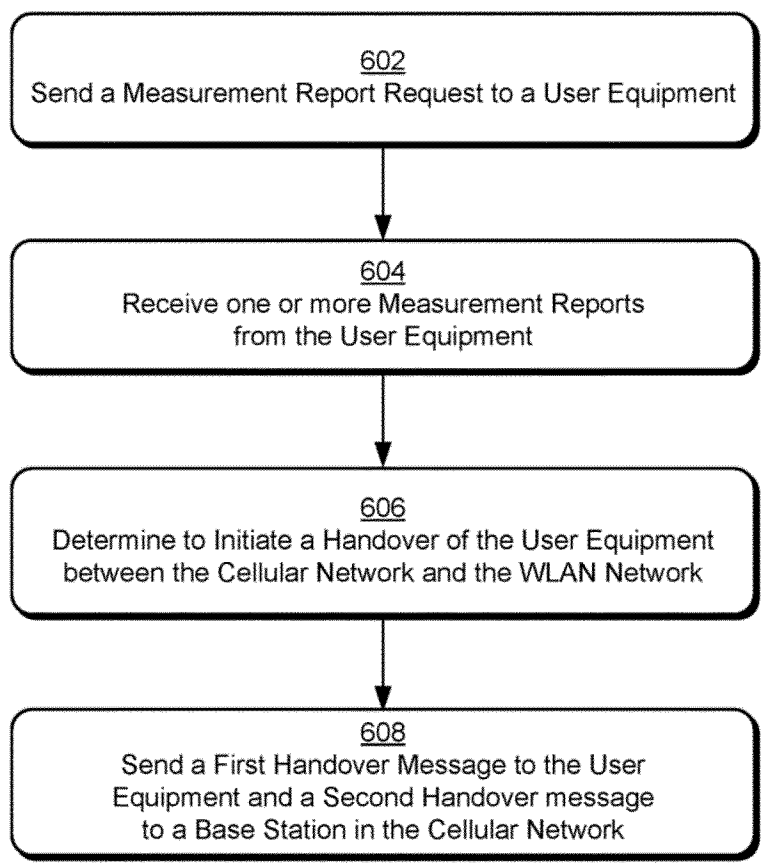
Fig. 6

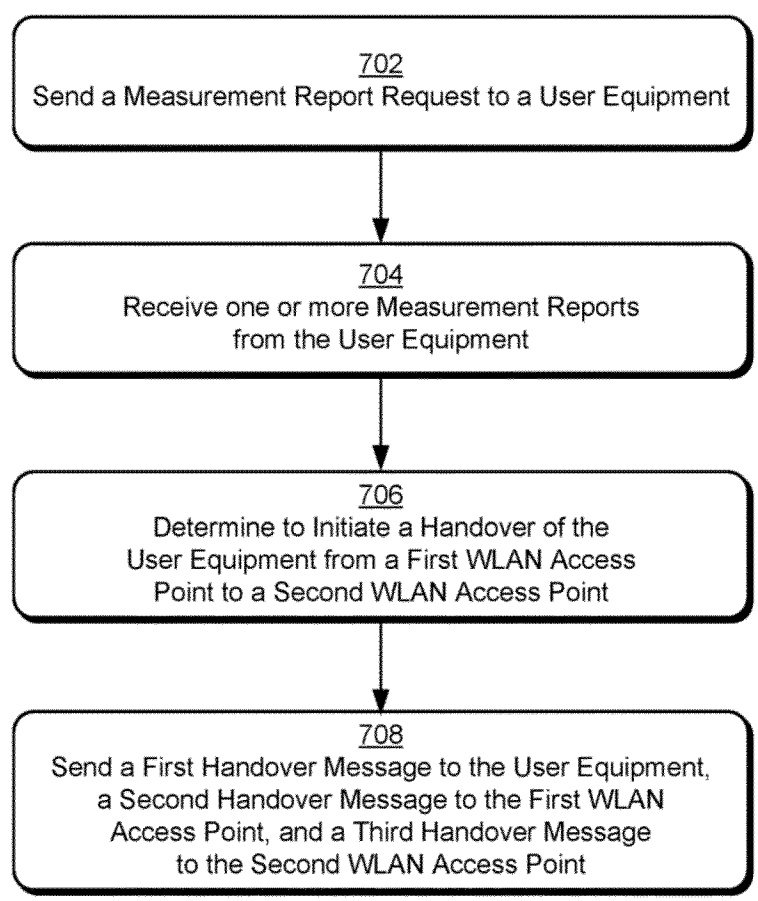
Fig. 7

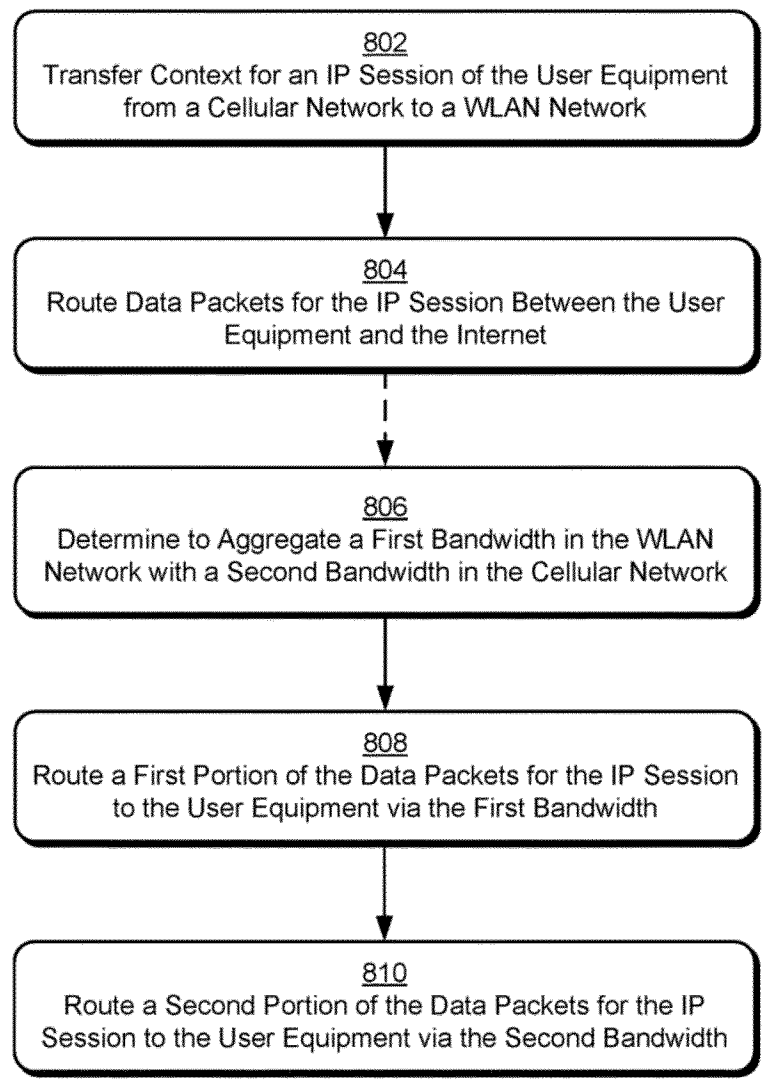
Fig. 8

MANAGING MOBILITY BETWEEN A CELLULAR NETWORK AND A WIRELESS LOCAL AREA NETWORK (WLAN)

BACKGROUND

The evolution of wireless communication to fifth generation (5G) standards and technologies provides higher data rates and greater capacity with improved reliability and lower latency that enhances mobile broadband services. 5G technologies also provide new classes of service for vehicular networking, fixed wireless broadband, and the Internet of Things (IoT).

For a class of service, such as enhanced mobile broadband, 5G networks provide higher data rates than conventional cellular systems. However, it is still desirable to use Wireless Local Area Network (WLAN) networks for mobile broadband in various settings, such as a home or office, or to reduce power consumption in mobile devices.

Offloading data traffic from cellular networks to WLAN and handing over network connections from cellular to WLAN reduces the cost of data transmission for end users and network operators. However, conventional techniques for interoperability between cellular and WLAN place the burden of tracking Internet Protocol (IP) sessions and addresses during handovers on application layer entities and these techniques have challenges with handover timing, dropped data traffic and context, unreliable WLAN access points, varying levels of service quality, or the like.

SUMMARY

This summary is provided to introduce simplified concepts of managing mobility between a cellular network and a wireless local area network (WLAN). The simplified concepts are further described below in the Detailed Description. This summary is not intended to identify essential features of the claimed subject matter nor is it intended for use in determining the scope of the claimed subject matter.

In some aspects, a method of managing mobility of a user equipment between a wireless local area network (WLAN) and a cellular network is described, in which a Cellular-WLAN Mobility Function (CWMF) server sends a measurement report request to a user equipment, via an Access and Mobility Function (AMF) and a base station, and receives one or more measurement reports from the user equipment via the base station and the AMF. The CWMF server determines, based at least in part on the one or more measurement reports, to initiate handover of the user equipment between the cellular network and the WLAN network and sends a first handover message to the user equipment, via the AMF and the base station, and sends a second handover message to the base station via the AMF in the cellular network, is the first handover message and the second handover message being effective to cause the handover of the user equipment between the cellular network and a first WLAN access point in the WLAN network.

In other aspects, a Cellular-WLAN Mobility Function (CWMF) server device includes one or more processors and a memory comprising instructions for a Cellular-WLAN Mobility Manager application. The instructions are executable by the one or more processors to configure the one or more processors to send a measurement report request to a user equipment via an Access and Mobility Function (AMF) and a base station, and receive one or more measurement reports from the user equipment via the base station and the AMF. The instructions are executable by the one or more processors to configure the one or more processors to determine, based at least in part on the one or more measurement reports, to initiate handover of the user equipment between a cellular network and a WLAN network, and send a first handover message to the user equipment, via the AMF and the base station, and send a second handover message to the base station via the AMF in the cellular network, the sending the first handover message and the second handover message effective to cause the handover of the user equipment between the cellular network and a first WLAN access point in the WLAN network.

In further aspects, a method of managing mobility of a user equipment between a WLAN network and a cellular network is described in which the user equipment sends one or more measurement reports to a Cellular-WLAN Mobility Function (CWMF), via a base station and an Access and Mobility Function (AMF). The user equipment receives a handover message from the CWMF, via the AMF and the base station, and performs a handover between the cellular network and a WLAN access point in the WLAN network based on handover parameters included in the received handover message.

BRIEF DESCRIPTION OF THE DRAWINGS

Aspects of managing mobility between a cellular network and a wireless local area network (WLAN) are described with reference to the following drawings. The same numbers are used throughout the drawings to reference like features and components:

FIG. 1 illustrates an example wireless network environment in which various aspects of managing mobility between a cellular network and a wireless local area network (WLAN) can be implemented.

FIG. 2 illustrates an example environment as generally relating to cellular and WLAN networks that can implement various aspects of managing mobility between a cellular network and a wireless local area network (WLAN).

FIG. 3 illustrates example details of data and control transactions between devices of a handover between cellular and WLAN network in accordance with aspects of managing mobility between a cellular network and a wireless local area network (WLAN).

FIG. 4 illustrates example details of data and control transactions between devices of a handover between WLAN access points in accordance with aspects of managing mobility between a cellular network and a wireless local area network (WLAN).

FIG. 5 illustrates an example device diagram for a device that can implement various aspects of managing mobility between a cellular network and a wireless local area network (WLAN).

FIG. 6 illustrates an example method of managing mobility between a cellular network and a wireless local area network (WLAN) as generally related to a handover of a user equipment between a cellular network and a WLAN network in accordance with aspects of the techniques described herein.

FIG. 7 illustrates an example method of managing mobility between a cellular network and a wireless local area network (WLAN) as generally related to a handover of a user equipment between WLAN access points in accordance with aspects of the techniques described herein.

FIG. 8 illustrates an example method of managing mobility between a cellular network and a wireless local area network (WLAN) as generally related to packet data routing in accordance with aspects of the techniques described herein.

DETAILED DESCRIPTION

Overview

This document describes improvements in mobility management for user equipment between cellular and WLAN (e.g., Wi-Fi) networks. A Cellular-WLAN Mobility Function (CWMF) is introduced to manage routing of packet data over cellular and WLAN networks to user equipment. The CWMF enables the transfer of packet data context between cellular and WLAN networks, improved handovers between cellular and WLAN networks, Quality of Service (QoS) management of WLAN networks, and aggregation of cellular and WLAN bandwidths to improve data throughput for user equipment.

The techniques described connect managed WLAN Access Points (APs) to an Authentication and Mobility Function (AMF) of a cellular network via the CWMF. The CWMF transfers a packet data context for the user equipment between the cellular and WLAN networks to reduce dropped packets and retransmissions during transitions of data traffic between the cellular network and the WLAN network. By managing a single IP context during handovers, as well as aggregations of cellular and WLAN, application layer entities do not need to track multiple IP contexts, as a single IP context is maintained through a handover between cellular and WLAN and for aggregations of cellular and WLAN.

The CWMF requests measurements of cellular and WLAN networks from the user equipment and WLAN APs, including alternative WLAN APs. The CWMF uses the measurements to determine when to trigger the handover of the user equipment between WLAN access points or between the cellular network and the WLAN network. The CWMF monitors the backhaul performance and Quality of Service (QoS) of WLAN networks and WLAN APs to determine if a particular WLAN AP is a good candidate to support data traffic to the user equipment or if the user equipment should be handed over to another WLAN AP or to the cellular network.

In aspects, managing mobility between a cellular network and a wireless local area network (WLAN) provides new interfaces, messages, and management functions to support coordination of communications between cellular and WLAN networks and to manage mobility of user equipment and data traffic of the user equipment between cellular and WLAN networks.

While features and concepts of the described systems and methods for managing mobility between a cellular network and a wireless local area network (WLAN) can be implemented in any number of different environments, systems, devices, and/or various configurations, aspects of managing mobility between a cellular network and a wireless local area network (WLAN) are described in the context of the following example devices, systems, and configurations.

Example Environment

FIG. 1 illustrates an example environment 100, which includes a user equipment 110 (UE 110) that communicates with a base station 120 through a wireless communication link 102 (wireless link 102). In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base station 120 communicates with the user equipment 110 via the wireless link 102, which may be implemented as any suitable type of wireless link. The wireless link 102 can include a downlink of data and control information communicated from the base station 120 to the user equipment 110, an uplink of other data and control information communicated from the user equipment 110 to the base station 120, or both. The wireless link 102 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. The base station 120 and any additional base stations are collectively a Radio Access Network 130 (RAN 130, Evolved Universal Terrestrial Radio Access Network 130, or E-UTRAN 130), which are connected via an Evolved Packet Core 140 (EPC 140) network to form a wireless operator network.

The EPC 140 includes an Access and Mobility Function 150 (AMF 150) that provides control-plane functions such as registration and authentication of multiple user equipment 110, authorization, mobility management, or the like in a cellular network. The AMF 150 communicates with the base stations 120 in the RAN 130 and also communicates with multiple user equipment 110, via the base stations 120. The EPC 140 includes a User Plane Function 160 (UPF 160) that is a gateway to connect base stations 120 to the Internet 170. The EPC 140 may include additional features that are omitted from FIG. 1 for the sake of clarity. The user equipment 110 may connect, via the EPC 140, to public networks, such as the Internet 170 to interact with a remote service 180.

The user equipment 110 also can connect to the Internet 170 using a WLAN connection 104 to a WLAN access point 190 that is connected to the Internet 170. The WLAN access point 190 may be located in a user's home, an office, airport, coffee shop, and so forth. Each WLAN access point 190 may be independently operated, such as in a user's home, may be part of an enterprise network, or may be operated as part of a public network of WLAN access points operated by a wireless network operator. The WLAN wireless network operator may be the same as the operator of the RAN 130 or different than the operator of the RAN 130.

FIG. 2 illustrates an example environment 200 in which various aspects of managing mobility between a cellular network and a wireless local area network (WLAN) can be implemented. A first cellular network of a first wireless network operator is shown at 202, a second cellular network of a second wireless network operator is shown at 204, and a WLAN network is shown at 206.

Each cellular network includes multiple base stations 120. For the sake of clarity, a single base station 120 is illustrated for the first cellular network 202 as base station 121 and for the second cellular network as base station 122. Each cellular network includes a User Plane Function (UPF) 160, illustrated as UPF 161 and UPF 162, which is a gateway to connect base stations 120 to the Internet 170. Base stations 121 and 122 connect to UPF 161 and 162, respectively, via an NG3 interface, at 220 and 221, respectively. The UPF 161 and the UPF 162 connect to the Internet 170 via an NG6 interface, at 222 and 223, respectively. Each cellular network includes an Access and Mobility Function 150 (AMF 150) illustrated as AMF 151 and AMF 152. Base stations 121 and 122 connect to AMF 151 and 152, respectively, via an NG2 interface, at 224 and 225, respectively.

The WLAN network 206 includes multiple WLAN APs 190 illustrated as WLAN Access Points 191-199. The WLAN APs 191-199 are connected to a Cellular-WLAN Mobility Function 210 (CWMF 210), via a network connection that manages the WLAN APs 190-199 and routes data traffic for user equipment 110 in the WLAN network 206 to and from the Internet 170 via a WLAN user-plane data connection, at 226. The CWMF 210 is also connected to the AMF 150 of one or more cellular networks for control-plane signaling, such as the AMF 151 and the AMF 152, at 227 and 228, respectively. The CWMF 210 registers with an AMF 150 with a secure and authenticated connection to be a trusted CWMF. The CWMF 210 is also connected via secure and authenticated connections to the UPF 160 of one or more cellular networks for communication of user-plane data, such as the UPF 161 and the UPF 162, at 229 and 230, respectively. The secure and authenticated connections can be established using any suitable techniques such as certificate-based authentication, public or private key encryption, or the like.

Although illustrated as providing WLAN connectivity for the first cellular network and the second cellular network, the WLAN network 206 may provide WLAN connectivity to any number of cellular networks. Likewise, although the first cellular network 202 and the second cellular network 204 are illustrated as being connected to a single WLAN network 206, the first cellular network 202 and the second cellular network 204 may each be connected to any number of common or different WLAN networks, each including a CWMF 210.

Cellular-WLAN Mobility Operations

To overcome issues, such as dropped packets and retransmissions, that can arise when switching packet data traffic for the user equipment 110 from a cellular network to a WLAN network, the CWMF 210 manages the transfer of packet data context between a cellular network and a WLAN network. Context information for an IP session of the user equipment 110 includes context related to protocols such as Transmission Control Protocol (TCP), User Datagram Protocol (UDP) and/or Internet Protocol (IP), an IP address, user identity information, QoS parameters, port numbers, or the like. In aspects, when the IP session of the user equipment 110 is transferred from the cellular network 202 to the WLAN network 206, the context for an IP session is transferred from the cellular network 202 to the WLAN network 206 by the CWMF 210, which then routes data between the user equipment 110 and the Internet 170. The IP session information is maintained, such as maintaining a single IP address, throughout and after a handover, without creating an additional IP address to facilitate the handover.

FIG. 3 illustrates details of example data and control transactions between devices engaged in a handover between a cellular network and a WLAN network in accordance with various aspects of managing mobility between a cellular network and a wireless local area network (WLAN). In aspects, the CWMF 210 can assist in the handover of the user equipment 110 between a cellular network and a WLAN network. The CWMF 210 can determine and communicate parameters for a handover to the user equipment 110 and via the AMF 150 to the base station 120. The parameters for the handover may include a timing of the handover, a target frequency or channel, a target bandwidth, a target cell or station identifier (e.g., BSSID, SSID, or ESS), a target access point configuration, a user equipment or station (STA) identity on the target access point, a radio configuration, a transmit power, a data Quality of Service (QoS) configuration, a security configuration (e.g., a security algorithm, a security strategy, security keys, security identities, security offsets or the like), a measurement configuration on the target station, or higher (Non-access stratum, NAS) layer configurations, or the like. The CWMF 210 can configure a measurement report for the user equipment 110 to determine metrics for the cellular network and the WLAN network to be measured by the user equipment 110. Based on the metrics, the CWMF 210 can determine when to initiate the handover.

In an example, the CWMF 210 sends a measurement report request to the user equipment 110, at 302, via the AMF 150 at 304 and the base station 120 at 306. The measurement report request includes parameters for measurement of the cellular and/or WLAN networks by the user equipment 110, such as link quality measurements, upper-layer metrics, a period of time over which to perform the measurements, a time interval between measurements, a number of measurement reports to provide, or the like. The CWMF 210 can include a number of WLAN APs 190 to measure that may include a WLAN AP 190 to which the user equipment 110 is currently connected, as well as other WLAN APs 190 that may be candidates to provide a WLAN connection to the user equipment 110. The user equipment 110 measures the requested parameters and provides one or more measurement reports to the CWMF 210, at 308, via the base station 120 at 310 and the AMF 150 at 312.

Based on the received measurement reports, the CWMF 210 determines whether or not to handover one or more bearers of the user equipment 110 to a WLAN AP 190 in the WLAN network 206. If the CWMF 210 determines the WLAN network 206 will provide the required QoS for the user equipment 110, the CWMF 210 sends a first handover message to the user equipment 110 at 314, via the AMF 150 at 316, and the base station 120 at 318. The CWMF 210 sends a second handover message to the base station 120 at 320, via the AMF 150 at 322. The handover message sent to the user equipment 110 may be sent via the cellular network or the WLAN network. The handover message includes parameters for the handover, such as a timing of when to perform the handover, target radio frequency, physical channel configuration, security configuration, target channel bandwidth, uplink power, target Service Station Identifier (SSID), or the like. Although this example describes a handover from cellular to WLAN, the described techniques apply equally to handovers of the user equipment 110 from a WLAN network to a cellular network.

At the time indicated for the handover, the user equipment 110 is handed over from the base station 120 of the cellular network to a WLAN AP 190 in the WLAN network 206. The user equipment 110 sends a handover status to the CWMF 210, at 324, via the base station 120 at 326 and the AMF 150 at 328. The base station 120 sends handover status to the CWMF 210, at 330, via the AMF 150 at 332. The handover status may include a handover complete or handover succeeded indication (sent to target access point), a log available or radio link failure information available indication (indicating that measurement data for a failed handover is available and is sent to the previous serving access point or base station), or a handover failure or rejection indication with an optional reason for the failure or rejection (sent to the previous serving access point or base station).

FIG. 4 illustrates details of example data and control transactions between devices engaged in a handover between a first WLAN access point and a second WLAN access point in a WLAN network in accordance with various aspects of managing mobility between a cellular network and a wireless local area network (WLAN). In aspects, the CWMF 210 can manage the handover of the user equipment 110 from the first WLAN AP 191 to the second WLAN AP 192 in the WLAN network 206. The CWMF 210 can determine and communicate the parameters for the handover to the user equipment 110, the first WLAN AP 191, and the second WLAN AP 192. The CWMF 210 can configure a measurement report for the user equipment 110 to determine metrics of the first WLAN AP 191, and the second WLAN AP 192 to be measured by the user equipment 110. Based on the metrics, the CWMF 210 can determine the parameters for the handover.

In an example, the CWMF 210 sends a measurement report request to the user equipment 110 at 402, via the WLAN AP 191 at 404. The measurement report request includes parameters for measurement of WLAN APs 190 by the user equipment 110, such as link quality measurements, upper-layer metrics, a period of time over which to perform the measurements, a time interval between measurements, a number of measurement reports to provide, or the like. In the measurement report request the CWMF 210 can include a number of WLAN APs 190 to measure that may include the first WLAN AP 191 and the second WLAN AP 192, as well as other WLAN APs 190 that may be candidates to provide a WLAN connection to the user equipment 110. The user equipment 110 measures the requested parameters and provides one or more measurement reports to the CWMF 210 at 406, via the WLAN AP 191 at 408.

Based on the received measurement reports, the CWMF 210 determines whether or not to handover the user equipment 110 from the first WLAN AP 191 to the second WLAN AP 192. If the CWMF 210 determines the second WLAN AP 192 will provide the required QoS for the user equipment 110, the CWMF 210 sends a first handover message to the user equipment 110 at 410, via the WLAN AP 191 at 412, a second handover message to the first WLAN AP 191 at 414, and a third handover message to the second WLAN AP 192 at 416. The handover message includes parameters for the handover. The parameters for the handover may include a timing of the handover, a target frequency or channel, a target bandwidth, a target cell or station identifier (e.g., BSSID, SSID, or ESS), a target access point configuration, a user equipment or station (STA) identity on the target access point, a radio configuration, a transmit power, a data Quality of Service (QoS) configuration, a security configuration (e.g., a security algorithm, a security strategy, security keys, security identities, security offsets or the like), a measurement configuration on the target station, or higher (Non-access stratum, NAS) layer configurations, or the like.

At the time indicated for the handover, the user equipment 110 is handed over from the first WLAN AP 191 to the second WLAN AP 192. The user equipment 110 sends handover status to the CWMF 210 at 418, via the WLAN AP 192 at 420. The first WLAN AP 191 sends handover status to the CWMF 210 at 422, and the second WLAN AP 192 sends handover status to the CWMF 210 at 424. The handover status may include a handover complete or handover succeeded indication (sent to target access point), a log available or radio link failure information available indication (indicating that measurement data for a failed handover is available and is sent to the previous serving access point), or a handover failure or rejection indication with an optional reason for the failure or rejection (sent to the previous serving access point).

WLAN Network Management

In aspects, the CWMF 210 monitors the Quality of Service (QoS) provided by the WLAN network 206 and the individual WLAN APs 190 in the WLAN network 206. The CWMF 210 can use the monitored QoS parameters in handover decisions, as well as to manage and configure the WLAN APs 190. For example, the CWMF 210 can monitor QoS parameters of uplink and downlink communications by the WLAN APs 190 including TCP throughput, UDP throughput, IP throughput, dropped packet rates, packet retransmission rates, backhaul performance to the WLAN APs 190, latency between the WLAN APs 190 and the user equipment 110, measurements of the radio environment about the WLAN APs 190, or the like.

In a further aspect, the CWMF 210 can manage and configure the WLAN APs 190. For example, the CWMF 210 can configure the operating frequency or channel, the channel bandwidth, the transmit power, protocol filtering, or the like of a WLAN AP 190. The CWMF 210 may configure the WLAN APs 190 in various ways to optimize the performance of the WLAN network 206 by reducing interference between WLAN APs 190, load balancing traffic between WLAN APs 190, or the like. The CWMF 210 may implement aspects of Self-Organizing Networks (SON), such as automatically configuring a new WLAN AP 190 that is added to the WLAN network 206, automatically optimizing the configuration of WLAN APs 190, and/or healing the WLAN network 206 when one of the WLAN APs 190 fails or goes offline.

In another aspect, the CWMF 210 can manage the routing of packet data between WLAN and cellular networks to support aggregation of cellular and WLAN bandwidth to provide a user equipment 110 with higher data rates. For example, the CWMF 210 routes a first portion of data packets in an IP session to the user equipment 110 via the WLAN network 206 and a second portion of the data packets in the IP session via the cellular network 202 to the user equipment 110. The CWMF 210 may route the second portion of the data packets via the UPF 161, which is connected to the CWMF 210 by the user-plane data connection 229. The UPF 161 relays the second portion of the data packets to the user equipment 110 via the base station 121 over the NG3 interface 220. Alternatively, the AMF 151 may be used to forward user-plane data to the base station 121 over the connections 227 and 224 from the CWMF 210.

Example Device

FIG. 5 illustrates an example device diagram 500 of the CWMF 210. The CWMF 210 may include additional features that are omitted from FIG. 5 for the sake of clarity.

The device diagram for the CWMF 210 shown in FIG. 5 includes a single network node (e.g., a server). The functionality of the CWMF 210 may be distributed across multiple network nodes and/or devices and may be distributed in any fashion suitable to perform the functions described herein. The CWMF 210 includes processor(s) 502 and computer-readable storage media 504 (CRM 504). The processor 502 may be a single core processor or a multiple core processor composed of a variety of materials, such as silicon, polysilicon, high-K dielectric, copper, and so on. CRM 504 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 506 of the CWMF 210. The CRM 504 includes applications, such as a cellular-WLAN mobility manager application 508 to manage and control mobility of multiple user equipment 110 within the WLAN network 206 and/or between the cellular network 202 and the WLAN network 206, and/or an operating system of the CWMF 210, which are executable by processor(s) 502 to enable communication with the user equipment 110, the WLAN APs 190, and the AMF 150. The CWMF 210 includes one or more network interfaces 510 for communication with the WLAN APs 190, the AMF 150, the Internet 170, other devices in the EPC 140, the user equipment 110, and/or devices in the RAN 130.

Example Methods

Example methods 600-800 are described with reference to FIGS. 6-8 in accordance with one or more aspects of managing mobility between a cellular network and a wireless local area network (WLAN). The order in which the method blocks are described are not intended to be construed as a limitation, and any number of the described method blocks can be combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 6 illustrates example method(s) 600 of managing mobility between a cellular network and a wireless local area network (WLAN) as generally related to a handover of the user equipment 110 between a cellular network and a WLAN network. At block 602, a Cellular-WLAN Mobility Function server sends a measurement report request to a user equipment, via an AMF and a base station. For example, the CWMF 210 sends a measurement report request to the user equipment 110, via the AMF 150 and the base station 120.

At block 604, the Cellular-WLAN Mobility Function server receives one or more measurement reports from the user equipment, via the base station and the AMF. For example, the CWMF 210 receives one or more measurements reports regarding the cellular network 202 and the WLAN network 206 from the user equipment 110, via the base station 120 and the AMF 150.

At block 606, based at least in part on the one or more measurement reports, the Cellular-WLAN Mobility Function server determines to initiate a handover of the user equipment from the cellular network to the WLAN network. For example, based on the one or more measurement reports, the CWMF 210 determines to initiate a handover of the user equipment 110 from the cellular network 202 to the WLAN network 206.

At block 608, the Cellular-WLAN Mobility Function server sends a first handover message to the user equipment, via the AMF and the base station, and a second handover message to the base station via the AMF in the cellular network, the first handover message and the second handover message being effective to cause the handover of the user equipment between the cellular network and the WLAN network. For example, the CWMF 210 sends a first handover message to the user equipment 110 via the AMF 150 and the base station 120, and sends a second handover message to the base station 120 via the AMF 150 in the cellular network 202, the first handover message and the second handover message being effective to cause the handover of the user equipment 110 between the cellular network 202 and the WLAN network 206.

FIG. 7 illustrates example method(s) 700 of managing mobility between a cellular network and a wireless local area network (WLAN) as generally related to a handover of the user equipment 110 between WLAN access points in a WLAN network. At block 702, a Cellular-WLAN Mobility Function server sends a measurement report request to a user equipment via a first WLAN access point. For example, the CWMF 210 sends a measurement report request to the user equipment 110 via the WLAN access point 191.

At block 704, the Cellular-WLAN Mobility Function server receives one or more measurement reports from the user equipment via the first WLAN access point. For example, the CWMF 210 receives one or more measurements reports from the user equipment 110 via the WLAN access point 191 regarding the WLAN access point 191 and the WLAN access point 192.

At block 706, based at least in part on the one or more measurements reports, the Cellular-WLAN Mobility Function server determines to initiate a handover of the user equipment from the first WLAN access point to the second WLAN access point. For example, based at least in part on the one or more measurement reports, the CWMF 210 determines to initiate a handover of the user equipment 110 from the WLAN access point 191 to the WLAN access point 192.

At block 708, the Cellular-WLAN Mobility Function server sends a first handover message to the user equipment via the first WLAN access point, sends a second handover message to the first WLAN access point, and sends a third handover message to the second WLAN access point, which is effective to cause the handover of the user equipment from the first WLAN access point to the second WLAN access point. For example, the CWMF 210 sends a first handover message to the user equipment 110 via the WLAN access point 191, sends a second handover message to the WLAN access point 191, and sends a third handover message to the WLAN access point 192, which is effective to cause the handover of the user equipment 110 from the WLAN access point 191 to the WLAN access point 192.

FIG. 8 illustrates example method(s) 800 of managing mobility between a cellular network and a wireless local area network (WLAN) as generally related to managing packet data context and routing packet data for the user equipment 110. At block 802, a Cellular-WLAN Mobility Function server transfers context for an IP session of a user equipment from a cellular network to a WLAN network, maintaining the IP session context throughout and after a handover from the cellular network to the WLAN network. For example, the CWMF 210 transfers context for an IP session of the user equipment 110 from the cellular network 202 to the WLAN network 206.

At block 804, the Cellular-WLAN Mobility Function routes packets for the IP session between the user equipment and the Internet, via the WLAN network. For example, the CWMF 210 routes packets for the IP session between the user equipment 110 and the Internet 170, via the WLAN network 206.

Optionally starting at block 806, the Cellular-WLAN Mobility Function determines to aggregate a first bandwidth in the WLAN network with a second bandwidth in the cellular network. For example, to provide higher data throughput for the IP session, the CWMF 210 determines to aggregate a first bandwidth in the WLAN network 206 with a second bandwidth in the cellular network 202.

At block 808, the Cellular-WLAN Mobility Function routes a first portion of the data packets for the IP session via the first bandwidth, by forwarding the first portion of the data packets to the user equipment via a WLAN access point. For example, the CWMF 210 routes a first portion of the data packets for the IP session to the user equipment 110 via the first bandwidth, by forwarding the first portion of the data packets to the user equipment 110 via the WLAN access point 191 in the WLAN network 206.

At block 810, the Cellular-WLAN Mobility Function routes a second portion of the data packets for the IP session via the second bandwidth, by forwarding the second portion of the data packets to the user equipment via a User Plane Function and a base station. For example, the CWMF 210 routes a second portion of the data packets for the IP session to the user equipment 110 via the second bandwidth, by forwarding the second portion of the data packets to the user equipment 110 via the UPF 161 and the base station 121 in the cellular network 202.

Although aspects of managing mobility between a cellular network and a wireless local area network (WLAN) have been described in language specific to features and/or methods, the subject of the appended claims is not necessarily limited to the specific features or methods described. Appended claims including a list of features that can be selected in "any combination thereof" includes combining any number and any combination of the listed features. Rather, the specific features and methods are disclosed as example implementations of managing mobility between a cellular network and a wireless local area network (WLAN) and other equivalent features and methods are intended to be within the scope of the appended claims. Further, various different aspects are described, and it is to be appreciated that each described aspect can be implemented independently or in connection with one or more other described aspects.

What is claimed is:

1. A method of managing mobility of a user equipment between a wireless local area network (WLAN) and a cellular network, the method comprising:
   receiving, at a Cellular-WLAN Mobility Function (CWMF), one or more measurement reports from the user equipment;
   determining, by the CWMF and based at least in part on the one or more measurement reports, to initiate handover of the user equipment between the cellular network and the WLAN network;
   sending a first handover message to the user equipment;
   sending a second handover message to a base station in the cellular network, the first handover message and the second handover message being effective to cause the handover of the user equipment between the base station and a first WLAN access point in the WLAN network;
   transferring context for an Internet Protocol (IP) session of the user equipment, by the CWMF, between the cellular network and the WLAN network;
   determining, by the CWMF, to aggregate a first bandwidth in the WLAN network with a second bandwidth in the cellular network for the IP session;
   routing a first portion of data packets for the IP session to the user equipment using the first bandwidth, via the first WLAN access point; and
   routing a second portion of the data packets for the IP session to the user equipment via the second bandwidth, via a User Plane Function (UPF) and the base station.

2. The method of claim 1, comprising:
   monitoring, by the CWMF, one or more Quality of Service (QoS) parameters of the WLAN network; and
   based on the monitoring, reconfiguring one or more WLAN access points in the WLAN network to change a measured value of one of the at least one of the QoS parameters of the WLAN network.

3. The method of claim 2, wherein the at least one QoS parameter includes: a Transmission Control Protocol (TCP) throughput, a User Datagram Protocol (UDP) throughput, and Internet Protocol (IP) throughput, a dropped packet rate, a packet retransmission rate, a latency between a WLAN access point and the user equipment, or any combination thereof.

4. The method of claim 2, comprising:
   based on the monitoring one or more QoS parameters, determining to initiate an additional handover of the user equipment from the first WLAN access point to a second WLAN access point in the WLAN network; and
   sending a third handover message to the user equipment, via the first WLAN access point; and
   sending a fourth handover message to the second WLAN access point,
   the third handover message and the fourth handover message being effective to cause the additional handover of the user equipment from the first WLAN access point to the second WLAN access point.

5. The method of claim 4, comprising:
   sending, by the CWMF, an additional measurement report request to the user equipment, via the second WLAN access point, to measure at least the first WLAN access point and the second WLAN access point;
   receiving, from the user equipment via the second WLAN access point, an additional measurement report including measurements of the first WLAN access point and the second WLAN access point; and
   determining by the CWMF and based at least in part on the additional measurement report, to initiate handover of the user equipment between the second WLAN access point and the first WLAN access point.

6. The method of claim 1, further comprising:
   receiving, by the CWMF, a first handover status from the user equipment, via the base station and an Access and Mobility Function (AMF); and
   receiving, by the CWMF, a second handover status from the base station, via the AMF.

7. The method of claim 1, wherein the measurement report request includes one or more measurement parameters for measurement of the cellular network, the WLAN network, or both.

8. The method of claim 1, further comprising:
   sending, by the CWMF, a measurement report request to the user equipment.

9. The method of claim 1, wherein the receiving the one or more measurement reports from the user equipment comprises:
   receiving the one or more measurement reports via the base station and an Access and Mobility Function (AMF).

10. The method of claim 1, wherein the sending the first handover message to the user equipment comprises:
sending the first handover message to the user equipment via an Access and Mobility Function (AMF) and the base station.

11. A Cellular-Wireless Local Area Network (WLAN) Mobility Function (CWMF) server device comprising:
one or more processors; and
a memory comprising instructions for a Cellular-WLAN Mobility Manager application, the instructions executable by the one or more processors to configure the one or more processors to:
receive one or more measurement reports from a user equipment;
determine, based at least in part on the one or more measurement reports, to initiate handover of the user equipment between a cellular network and a WLAN network; and
send a first handover message to the user equipment;
send a second handover message to a base station in the cellular network,
the sending the first handover message and the second handover message being effective to cause the handover of the user equipment between the cellular network and a first WLAN access point in the WLAN network;
transfer context for an Internet Protocol (IP) session of the user equipment from the cellular network to the WLAN network;
determine to aggregate a first bandwidth in the WLAN network with a second bandwidth in the cellular network for the IP session;
route a first portion of data packets for the IP session to the user equipment using the first bandwidth, via the first WLAN access point; and
route a second portion of the data packets for the IP session to the user equipment via the second bandwidth, via a User Plane Function (UPF) and the base station.

12. The CWMF server device of claim 11, the instructions executable by the one or more processors to configure the one or more processors to:
monitor one or more Quality of Service (QoS) parameters of the WLAN network; and
based on the monitoring, reconfigure one or more WLAN access points in the WLAN network to change a measured value of one of the at least one of the QoS parameters of the WLAN network.

13. The CWMF server device of claim 11, wherein the measurement report request includes one or more measurement parameters for measurement of the cellular network, the WLAN network, or both.

14. The CWMF server device of claim 12, wherein the at least one QoS parameter includes: a Transmission Control Protocol (TCP) throughput, a User Datagram Protocol (UDP) throughput, and Internet Protocol (IP) throughput, a dropped packet rate, a packet retransmission rate, a latency between a WLAN access point and the user equipment, or any combination thereof.

15. The CWMF server device of claim 12, the instructions executable by the one or more processors to configure the one or more processors to:
based on the monitoring of the one or more QoS parameters, determine to initiate an additional handover of the user equipment from the first WLAN access point to a second WLAN access point in the WLAN network; and
send a third handover message to the user equipment, via the first WLAN access point; and
send a fourth handover message to the second WLAN access point,
the third handover message and the fourth handover message being effective to cause the additional handover of the user equipment from the first WLAN access point to the second WLAN access point.

16. The CWMF server device of claim 11, the instructions executable by the one or more processors to configure the one or more processors to:
receive a first handover status from the user equipment, via the base station and an Access and Mobility Function (AMF); and
receive a second handover status from the base station, via the AMF.

17. A method of managing mobility of a user equipment between a WLAN network and a cellular network, the method comprising:
receiving a measurement report request;
sending one or more measurement reports to a Cellular-WLAN Mobility Function (CWMF);
receiving, by the user equipment, a first handover message from the CWMF; and
performing a handover between the cellular network and a first WLAN access point in the WLAN network based on handover parameters included in the received first handover message;
receiving, by the user equipment via the first WLAN access point, a first portion of data packets for an Internet Protocol (IP) session from the CWMF via a first bandwidth in the WLAN network; and
receiving, by the user equipment via a User Plane Function (UPF) and a base station, a second portion of the data packets for the IP session from the CWMF via a second bandwidth in the cellular network, the second bandwidth being aggregated with the first bandwidth.

18. The method of claim 17, wherein the measurement report request includes one or more measurement parameters for measurement of the cellular network, the WLAN network, or both.

19. The method of claim 17, further comprising:
reporting a status of the handover to the CWMF, via the WLAN access point.

20. The method of claim 15, further comprising:
reporting a status of the handover via the base station and an Access and Mobility Function (AMF).

21. The method of claim 17, further comprising:
receiving a second handover message via the first WLAN access point; and
based on the second handover message, performing an additional handover from the first WLAN access point to a second WLAN access point.

* * * * *